(12) United States Patent
Lee et al.

(10) Patent No.: US 7,349,169 B2
(45) Date of Patent: Mar. 25, 2008

(54) METHOD AND APPARATUS FOR IMPROVED STARTING AND/OR STOPPING IN A CONTACT START-STOP (CSS) HARD DISK DRIVE.

(75) Inventors: SungChang Lee, San Jose, CA (US); Brian D. Strom, Cupertino, CA (US); Shuyu Zhang, Fremont, CA (US); George Tyndall, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/586,775

(22) Filed: Oct. 25, 2006

(65) Prior Publication Data

US 2007/0297084 A1    Dec. 27, 2007

Related U.S. Application Data

(63) Continuation-in-part of application No. 11/525,681, filed on Sep. 22, 2006.

(60) Provisional application No. 60/816,162, filed on Jun. 23, 2006.

(51) Int. Cl.
*G11B 19/02* (2006.01)

(52) U.S. Cl. ...................................................... 360/69
(58) Field of Classification Search ................. 360/69, 360/75, 97.02; 310/323.04; 340/539.26; 324/210

See application file for complete search history.

(56) References Cited

U.S. PATENT DOCUMENTS

| | | | |
|---|---|---|---|
| 6,118,632 A * | 9/2000 | Albrecht et al. | 360/135 |
| 6,359,433 B1 * | 3/2002 | Gillis et al. | 324/210 |
| 6,781,782 B2 * | 8/2004 | Rochat et al. | 360/75 |
| 2005/0088300 A1 * | 4/2005 | Leung | 340/539.26 |
| 2007/0170817 A1 * | 7/2007 | Ikeda et al. | 310/323.04 |
| 2007/0279795 A1 * | 12/2007 | Strom et al. | 360/75 |

* cited by examiner

*Primary Examiner*—Fred F. Tzeng
(74) *Attorney, Agent, or Firm*—Earle Jennings; GSS Law Group

(57) ABSTRACT

CSS hard disk drive providing improved take-off and/or touchdown by asserting pitch actuation control signal stimulating a pitch actuator to flex a flexure finger, altering the pitch angle of slider coupling through flexure finger to pitch actuator. Method implemented by embedded circuit and/or embedded processor. Manufacturing embedded processor, embedded circuit, CSS hard disk drive, and these process products.

25 Claims, 26 Drawing Sheets

Fig. 13C
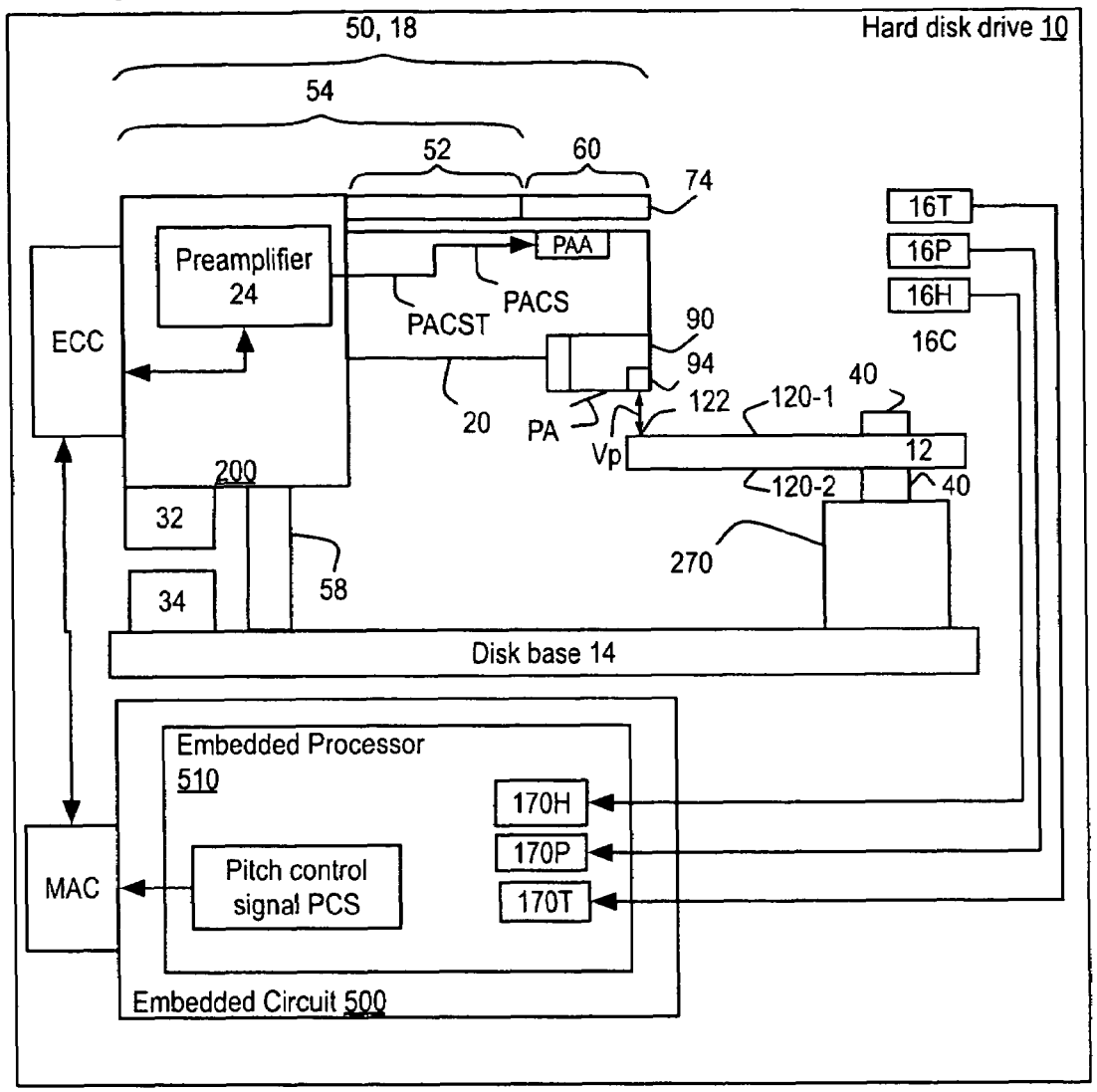
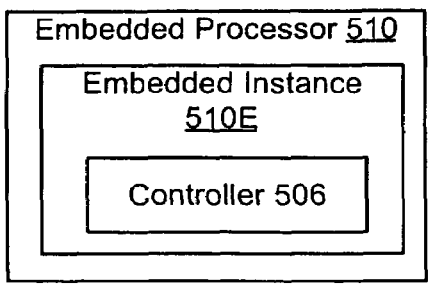
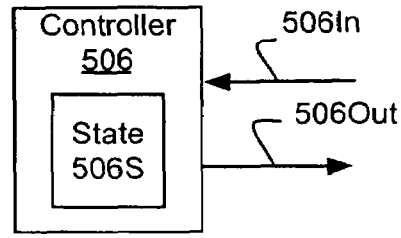
Fig. 13D        Fig. 13E

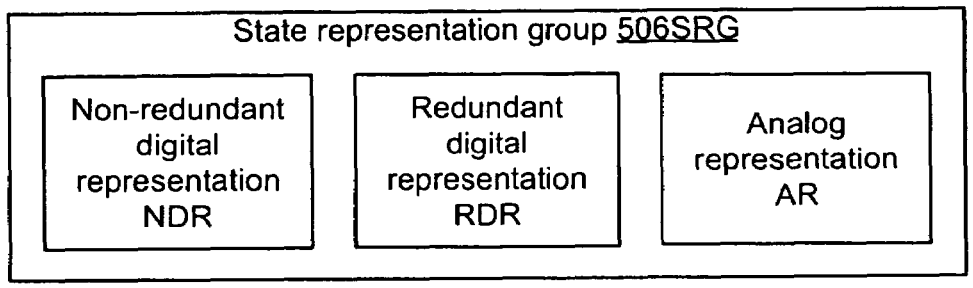
Fig. 13F
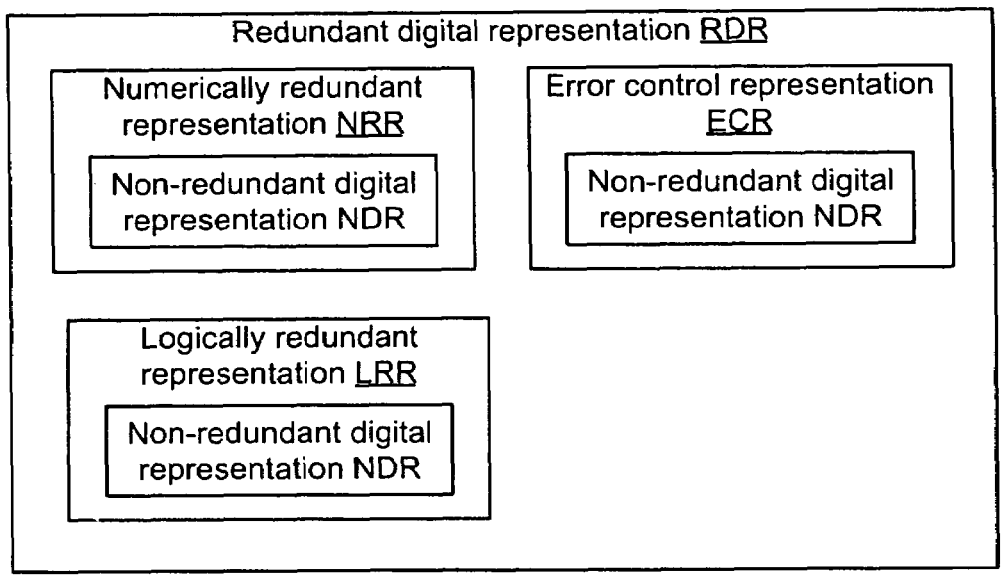
Fig. 13G
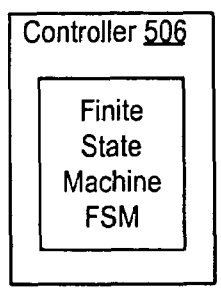 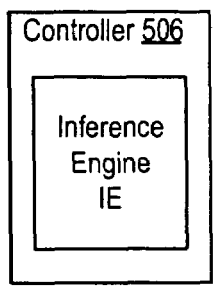 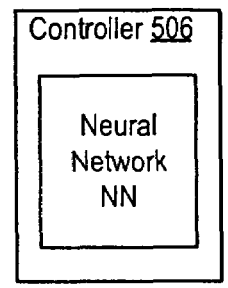
Fig. 13H        Fig. 13I        Fig. 13J

METHOD AND APPARATUS FOR IMPROVED STARTING AND/OR STOPPING IN A CONTACT START-STOP (CSS) HARD DISK DRIVE.

CROSS REFERENCE TO RELATED APPLICATIONS

This applications is a continuation-in-part to U.S. application Ser. No. 11/525,681 file Sep. 22, 2006, which is and claims priority to U.S. Provisional Patent Application No. 60/816,162 filed Jun. 23, 2006, all of which are incorporated herein by reference which is incorporated herein by reference.

TECHNICAL FIELD

This invention relates to starting and/or stopping methods and mechanisms in a CSS hard disk drive in particular, to starting and/or stopping by active control of the pitch angle of the slider to the rotating disk surface, in response to the temperature, air pressure and humidity within the hard disk drive.

BACKGROUND OF THE INVENTION

A CSS hard disk drive parks its slider on the disk surface near the inside diameter (ID) when not in operation. Doing this is economical, but engenders a number of problems, particularly with regards to the effects of temperature, humidity and air pressure as experienced within the CSS hard disk drive. Consequently, the discussion of the problem to be solved is found toward the beginning of the detailed description and the summary of the invention. Some terms should be mentioned here. Sliders in CSS hard disk drives tend to include at least one pad with diamond like carbon on their air bearing surface. Stiction refers herein to static friction and is encountered when the CSS hard disk drive starts rotating the disks, between the parked slider and the disk surface it is parked on. These pads act as the contact regions between the slider and the disk surface and are used to reduce stiction. Tipping refers herein to the slider losing it orientation to the disk surface and when parked, no longer contacting the disk surface only through the pads.

Some prior art hard disk drives include sliders using air bearing surfaces that provide fast take-off and late touch-down when starting and stopping a drive. One way to do this is to design for high flying pitch so take-off and touchdown occur at high pitch angles. Unfortunately, this approach often compromises other performance objectives, which may include stable flying and/or insensitivity to altitude or air pressure changes. Moreover, the prior art has focused on performance in dry air conditions, without accounting for the effects of humidity.

Methods and mechanisms are needed which can control the pitch angle upon take-off and touchdown to create fast take-off and/or late touchdown. What is further needed are methods and mechanisms which can estimate the humidity and air pressure and use these to optimize the control of take-off and/or touchdown.

SUMMARY OF THE INVENTION

One embodiment of the invention includes a method of controlling a head stack assembly for at least one member of a parking operation group consisting of a take-off process of at least one slider from a rotating disk surface of a Contact Start-Stop (CSS) hard disk drive and/or a touchdown process of the slider to the disk surface as shown in FIGS. 14A to 15.

The method may include receiving a temperature reading from a temperature sensor, a pressure reading from an air pressure sensor and a humidity reading from a humidity sensor, and at least one of the following:

First asserting a pitch actuation control signal for at least part of a take-off process.

And second asserting the pitch actuation control signal for at least part of the touchdown process.

Both asserting operations are based upon the temperature, pressure and humidity readings. The pitch actuator is stimulated based upon the asserted pitch actuation control signal causing the pitch actuator to alter the pitch angle of the slider coupled through a flexure finger to the pitch actuator.

Preferably, the method controls both members of the parking operation group for the CSS hard disk drive.

The method improves the take-off and touchdown performance of the slider under high humidity and/or high altitude (low air pressure) conditions by adjusting the pitch angle of the slider to the disk surface while minimizing power through only using the pitch actuators as needed. The invention enables the slider to take-off early and touchdown later than prior art approaches.

The method may further include third asserting the pitch actuation control signal during a track following process based upon the temperature reading, the pressure reading and the humidity reading.

The method may further include one of the following:

Fourth asserting the pitch actuation control signal for at least part of a track seek process.

Or fifth asserting the pitch actuation control signal for at least part of the track seek process based upon the temperature reading, and/or the pressure reading and/or the humidity reading.

Using this method delays head-disk contact in the touchdown process and shortens the time until the sliders are flying in the take-off process, which minimize the degradation the read-write heads and the disk surfaces from the head-disk contact while the disk surface is rotating.

Another embodiment of the invention includes an embedded circuit implementing the method within the CSS hard disk drive using an embedded processor. The embedded processor receives the temperature reading from the temperature sensor, the pressure reading from the air pressure sensor and the humidity reading from a humidity sensor.

Also, the embedded processor may first assert the pitch actuation control signal for at least part of the take-off process based upon the temperature reading, the pressure reading, and the humidity reading.

And/or the embedded processor may second assert the pitch actuation control signal for at least part of the touchdown process based upon the temperature reading, the pressure reading, and the humidity reading.

The embedded processor may preferably include at least one instance of a controller. As used herein, each controller receives at least one input, maintains and updates at least one state and generates at least one output based upon at least one of the inputs and/or at least one of the states.

At least one of the states includes at least one of a non-redundant digital representation, a redundant digital representation and/or an analog representation. A non-redundant digital representation frequently comprises at least one digit, which may frequently represent a bit with values of 0 and 1, a byte including eight bits, and so on. A redundant digital representation of a non-redundant digital representation may include a numerically redundant digital representation, an error control representation and/or a logically redundant representation. The following examples will serve to illustrate these non-redundant representations:

An example of a numerically redundant representation may be found in a standard multiplier, which will often use a local carry propagate adder to add three or four numbers together to generate two numeric components which redundant represent the numeric result of the addition.

An example of an error control representation will frequently use the non-redundant digital representation and an additional component formed as the function of the non-redundant digital representation. If this error control representation is altered by a few number of bits, a error correcting function reconstructs the original non-redundant digital representation. Quantum computers are considered as controllers which will tend to use this kind of error control representations for at least some states.

An example of a logically redundant representation may be found in the definition and implementation of many finite state machines, which often require that a single state be represented by any member of a multi-element set of non-redundant digital representations. Often the members of this set differ from at least one other member of the set by just one bit. Use of such logically redundant representations insure that the generation of glitches is minimized.

As used herein, a controller may include an instance of a finite state machine, and/or include an instance of an inference engine and/or an instance of a neural network and/or an instance of a computer directed by a program system including program steps residing in a memory accessibly coupled to the computer. As used herein, a computer includes at least one instruction processor and at least one data processor, where each of the data processors is directed by at least one of the instruction processors.

The embedded processor may include means for receiving the temperature reading from the temperature sensor, the pressure reading from the air pressure sensor and the humidity reading from a humidity sensor, and at least one of the following:

Means for first asserting the pitch actuation control signal for at least part of the take-off process based upon the temperature reading, the pressure reading, and the humidity reading.

And means for second asserting the pitch actuation control signal for at least part of the touchdown process based upon the temperature reading, the pressure reading, and the humidity reading.

The embedded processor may further implement the method by including third means for asserting the pitch actuation control signal during a track following process based upon the temperature reading, the pressure reading and the humidity reading.

The embedded processor may further include one of the following:

Fourth means for asserting the pitch actuation control signal for at least part of the track seek process.

Or fifth means for asserting the pitch actuation control signal for at least part of the track seek process based upon the temperature reading, and/or the pressure reading and/or the humidity reading.

The members of the means group consist of the means for receiving, the means for first asserting, the means for second asserting, the means for third asserting, the means for fourth asserting and/or the means for fifth asserting. Any of these members may be implemented by at least one instance of a computer directed by a program system including program steps residing in a memory accessibly coupled the computer, and/or a finite state machine, and/or an inferential engine and/or a neural network. As used herein, a computer includes at least one instruction processor and at least one data processor, where each of the data processors is directed by at least one of the instruction processors.

An embodiment of the invention may include manufacturing the embedded processor by providing the means for receiving and at least one of the means for first asserting the pitch actuation control signal for at least part of the take-off process and/or the means for second asserting the pitch actuation control signal for at least part of the touchdown process to create the embedded processor. The invention includes the embedded processor as a product of this process.

Another embodiment of the invention may include manufacturing the embedded circuit by providing the embedded processor to create the embedded circuit. The invention includes the embedded circuit as a product of this process.

Another embodiment of the invention includes the CSS hard disk drive further implementing the method and including a head stack assembly coupling to the embedded circuit to deliver the pitch actuation control signal to a pitch actuator in at least one head gimbal assembly for altering the pitch angle of the slider to the disk surface it accesses and a coupling of a humidity sensor, a temperature sensor and an air pressure sensor to the embedded circuit to provide the humidity reading, the temperature reading, and the pressure reading used in the method.

The invention further includes manufacturing the CSS hard disk drive by coupling the head stack assembly to the embedded circuit to provide the pitch actuation control signal as asserted by the embedded circuit. The CSS hard disk drive is a product of this manufacturing process.

BRIEF DESCRIPTION OF THE DRAWINGS

FIG. 13C show some aspects of the invention's embodiments of the embedded processor, the embedded circuit, and the CSS hard disk drive;

FIGS. 13D to 13J show some details of the embedded processor;

DETAILED DESCRIPTION

This invention relates to starting and/or stopping methods and mechanisms in a CSS hard disk drive in particular, to starting and/or stopping by active control of the pitch angle of the slider to the rotating disk surface, in response to the temperature, air pressure and humidity within the hard disk drive.

The invention improves the take-off and/or touchdown performance of a slider under high humidity and/or high altitude conditions by adjusting the pitch angle of the slider to the disk surface. The invention enables the slider to take-off early and/or touchdown later than prior art approaches. The invention improves the reliability and performance of a read-write head 94 by adapting the pitch angle of its slider 90 when the air bearing surface 92 uses at least one Pad with Diamond Like Carbon (PDLC), which will be referred to as a pad PDLC. These pads are commonly used in Contact Start-Stop (CSS) hard disk drives.

Figure 14A:
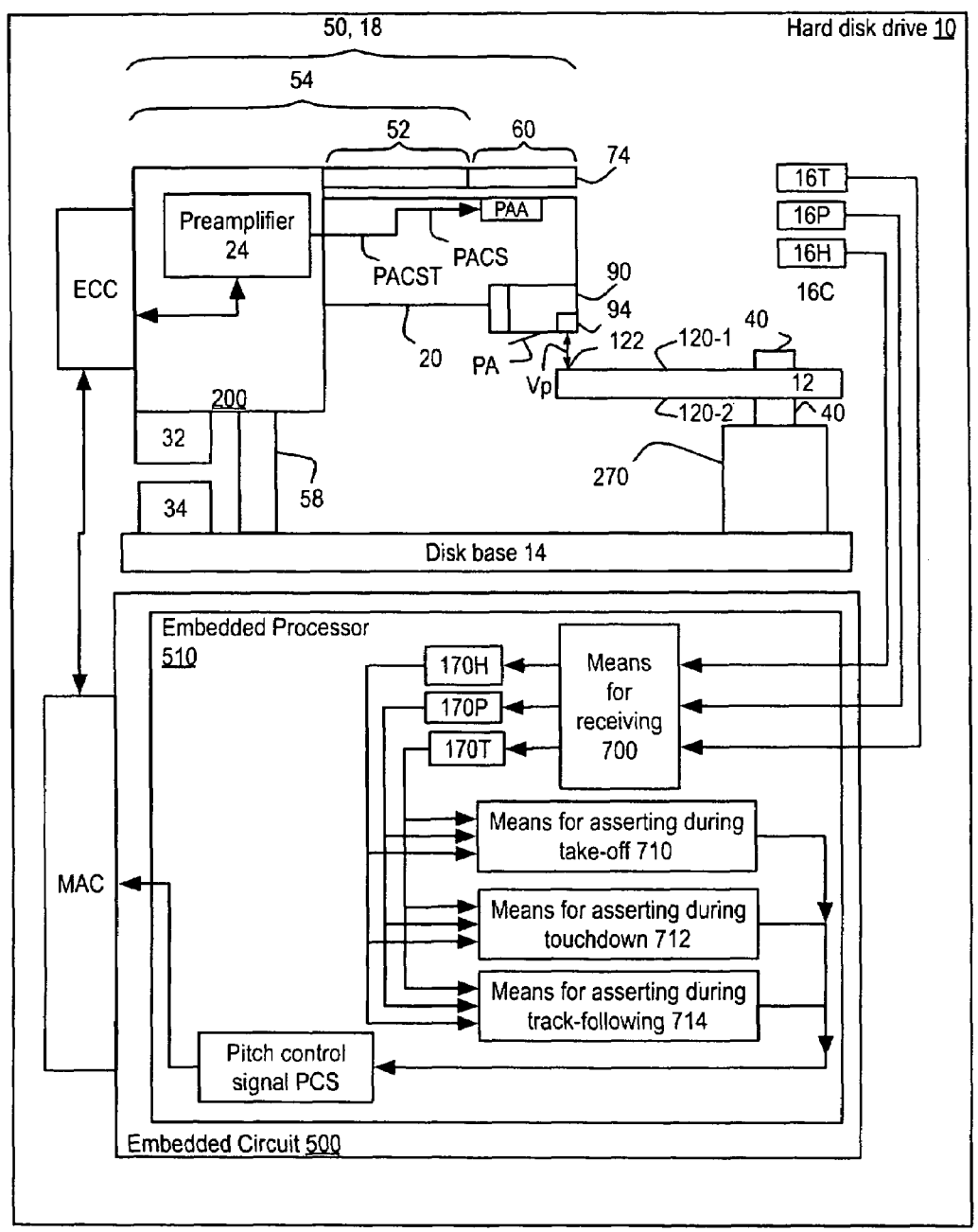
FIGS. 14A to 15 show some aspects of the embedded processor, the embedded circuit and the CSS hard disk drive of FIG. 13C.
Figure 14B:
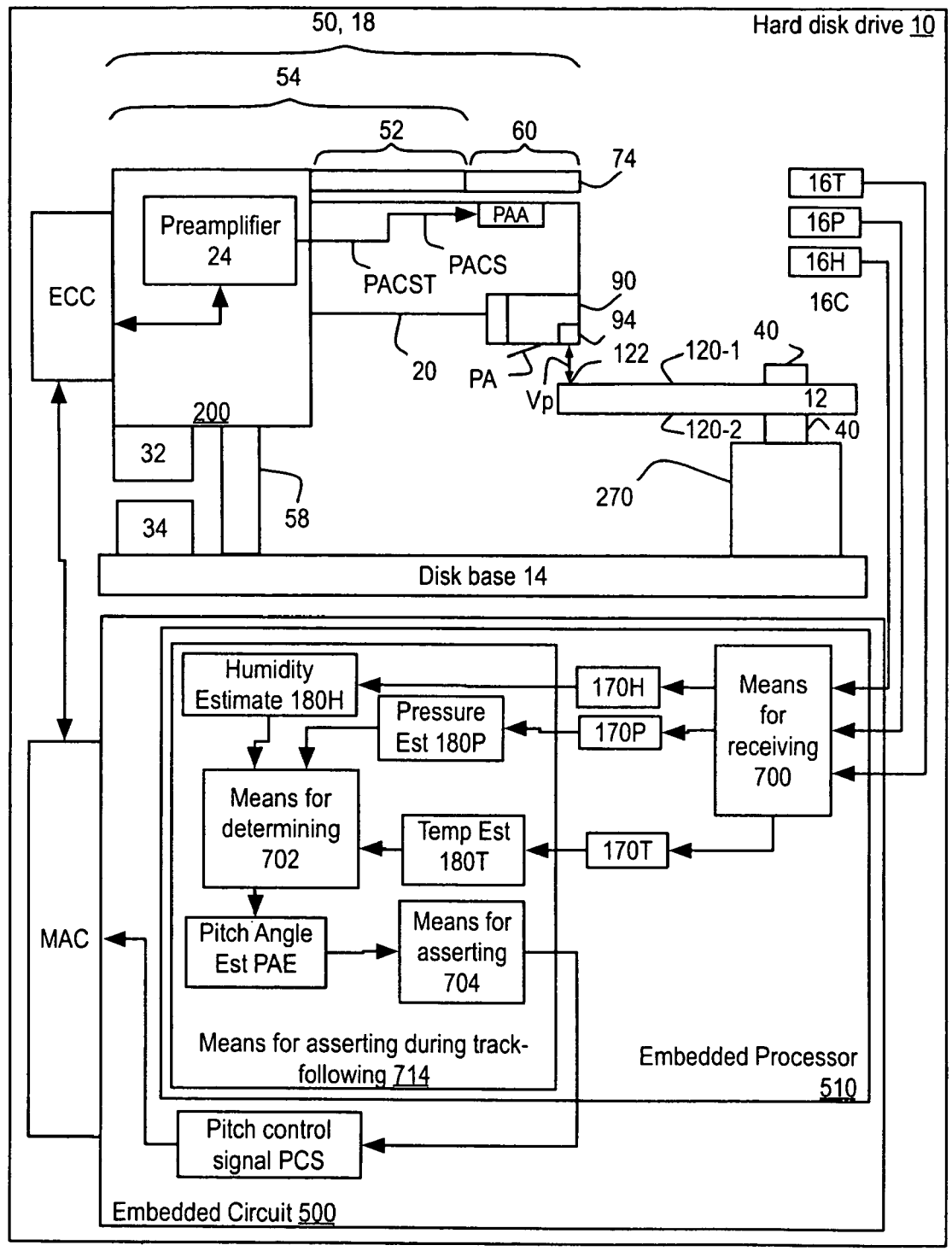
Figure 15:
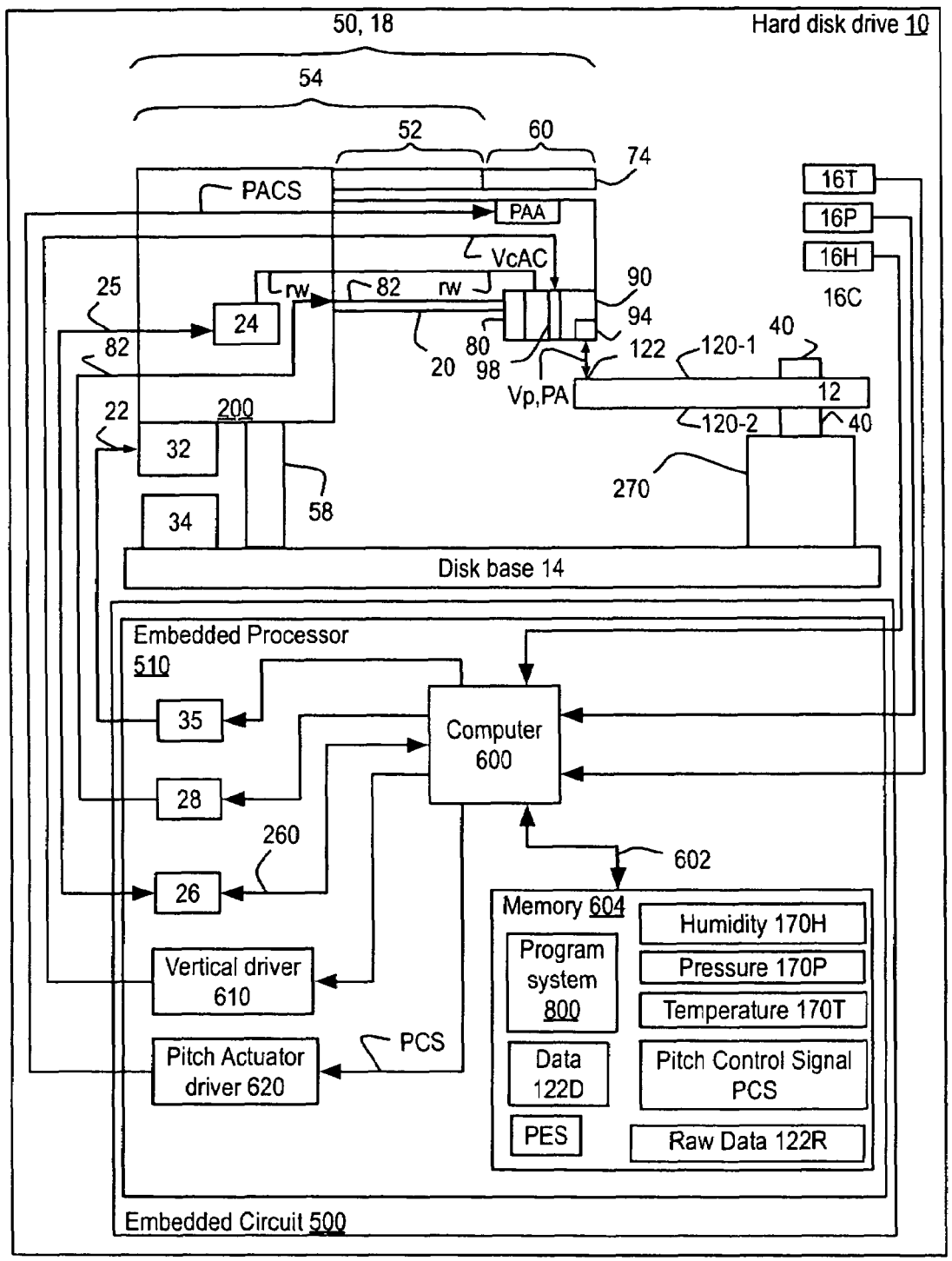

One embodiment of the invention includes a method of controlling a head stack assembly 50 for at least one member of a parking operation group consisting of a take-off process of at least one slider 90 from a rotating disk surface 120 of a CSS hard disk drive 10 and a touchdown process of the slider to the disk surface of the CSS hard disk drive as shown in FIGS. 14A to 15. The method includes receiving 700 a temperature reading 170T from a temperature sensor 16T, a pressure reading 170P from an air pressure sensor 16P and a humidity reading 170H from a humidity sensor 16H, and at least one of the following:

First asserting 710 a pitch actuation control signal PACS for delivery to a pitch actuator PAA for at least part of a take-off process.

And second asserting 712 the pitch actuation control signal for at least part of the touchdown process.

Both asserting operations are based upon the temperature, pressure and humidity readings. The pitch actuator is stimulated based upon the pitch actuation control signal causing the pitch actuator to alter the pitch angle PA of the slider 90 coupled through the flexure finger 20 to the pitch actuator.

Each sensor is included in the CSS hard disk drive 10. Preferably, the method controls both members of the parking operation group for the CSS hard disk drive.

The method improves the take-off and/or touchdown performance of the slider 90 under high humidity and/or high altitude (low air pressure) conditions by adjusting the pitch angle PA of the slider to the disk surface 120 while minimizing power through only using the pitch actuators as needed. The invention enables the slider to take-off early and/or touchdown later than prior art approaches.

Embodiments of the invention preferably adjust the pitch angle PA of at least one slider 90 included in a CSS hard disk drive 10 based upon readings of a temperature sensor 16T, a humidity sensor 16H and an air pressure sensor 16P included in the CSS hard disk drive:

Use of these sensor readings enables the CSS hard disk drive to take the preventive action of adjusting pitch angle even when the slider is not fully flying. Based on these sensor readings a pitch actuation control signal is asserted to the pitch actuator PAA near each slider 90, reducing head-disk contacts during take-off.

By reducing the contact duration of take-off, possibility of contact-induced read-write head 94 degradation can be reduced substantially, ensuring greater reliability for the CSS hard disk drive.

Based on these sensor readings an appropriate pitch angle may be calculated, a pitch actuation control signal is generated and then asserted to the pitch actuator near each slider.

Figure 1A:
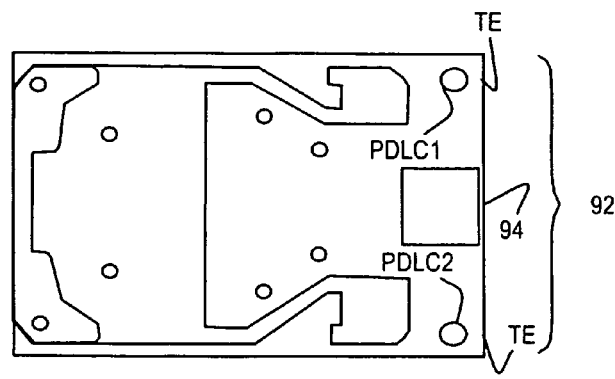
FIG. 1A shows an air bearing surface for a slider designed for low pitch angle which was used to generate the simulation results shown in FIGS. 1B and 1C.
Figure 1B:
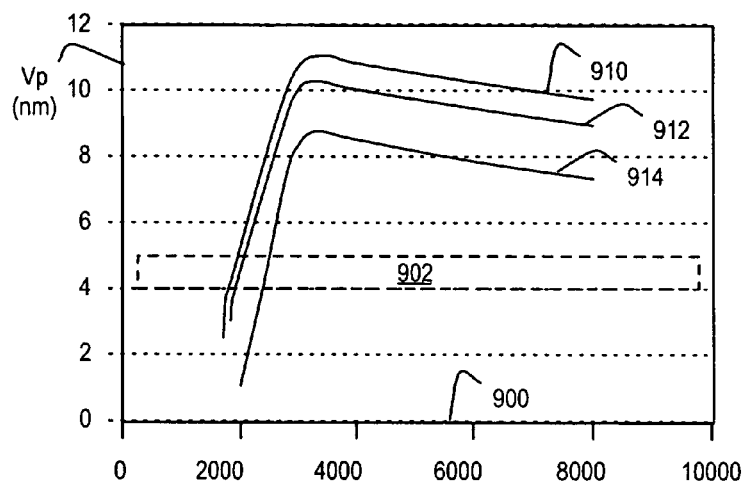
FIGS. 1D to 1F show the problem which can occur when the humidity is high and/or the pressure low for a slider of a CSS hard disk drive regarding its pitch angle.
Figure 1C:
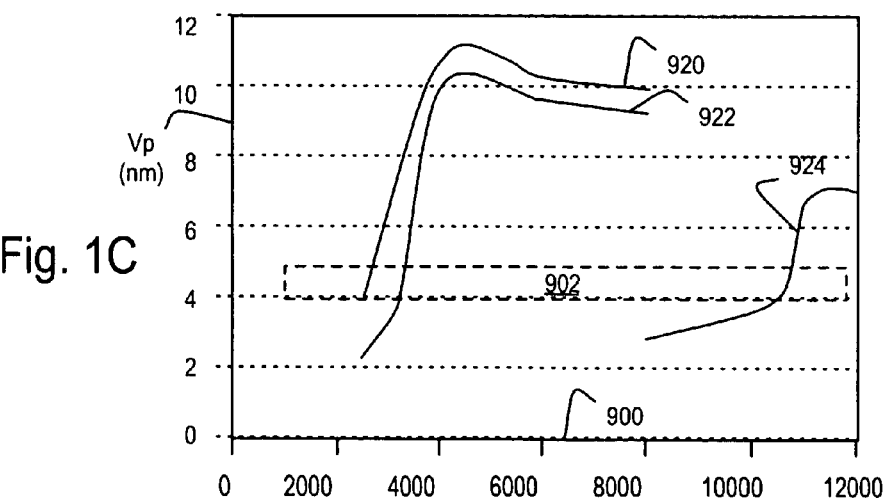

When the water vapor pressure is high, for instance when the relative humidity is 80% and the air temperature is 70° C., these conditions act to decrease lift, making the speed required to lift the slider 90 above glide height 902 for take-off increase with increasing water vapor pressure, as will be shown in the results of FIGS. 1B and 1C. For a CSS hard disk drive 10, each slider includes at least one pad PDLC on its air bearing surface 92, the flying contact configuration depends qualitatively on the pitch angle PA. Sliders with low flying pitch angle contact the disk surface at the trailing edge TE pads more commonly than slider with higher flying pitch angles.

Using this method delays head-disk contact of the slider 90 to the disk surface 120 in the touchdown process and shortens the time until the sliders are flying in the take-off process, minimizing the degradation the read-write head 94 and the disk surface from the head-disk contact which the disk surface is rotating.

The significance of pitch angle adjustment during take-off is demonstrated by following simulation case studies. By changing etch depth of air bearing surface 92 for a slider as shown in FIG. 1A, the inventors generated two typical pitch angle cases: 1) high pitch shown in FIG. 1B and 2) low pitch shown in FIG. 1C. FIGS. 1B and 1C show graphs where the vertical axis represents the vertical position Vp or flying height in nanometers (nm) and the horizontal axis shows the rotational speed of a disk 12 containing the disk surface 120 accessed by the case study slider 90. The air pressure in these simulations was one atmosphere, the assumed ambient condition.

The following are some definitions used herein. Saturation vapor pressure and partial water pressure are determined by the temperature and humidity conditions. Humidity refers to the water concentration in the air at a given temperature, which is usually referred in terms of relative humidity RH in percent as:

$$\% \, RH = \frac{P}{P^o} * 100 \qquad (1.1)$$

Where P is the partial pressure of water in the air and $P^o$ is the saturation vapor pressure. The saturation (water) vapor pressure is the maximum amount of water vapor that can be supported by the air at any given temperature. An empirical expression describing the dependence of the saturation vapor pressure on temperature (T) can be written as follows:

$$P^o = 0.0061 e^{(17.5 \times T)/(241+T)} \qquad (1.2)$$

where $P^o$ is given in units of atmospheres, and T is the temperature in degrees Celsius. It immediately follows from (1.1) that the partial pressure of water at a given RH also increases with temperature at the same rate. Should the water partial pressure exceed the saturation vapor pressure, then by definition there is more water in the air than is thermodynamically stable, and water condenses. As discussed below, the inventors find that condensation of water vapor has a significant impact on the flying behavior of the slider 90.

The water vapor in a hard disk drive 10 routinely becomes supersaturated when subjected to the high compression in the squeeze film of the air bearing (>10× compression is typical). This may be shown with the following example. Consider a hard disk drive operating at ambient pressure (1 atm), a temperature of 50° C., and 50% RH. The saturation vapor pressure of water at T=50° C. is $P^o$=0.122 atm. At 50% RH, the partial pressure of water will be, $P_{water}$=0.5× 0.122 atm=0.061 atm. Following Dalton's Law, the total pressure can be written in terms of the partial pressures of all the gaseous constituents:

$$P = P_1 + P_2 + P_3 + \ldots = \Sigma P_i \qquad (1.3)$$

Assuming that dry air is comprised of roughly 79% nitrogen and 21% oxygen lead the inventors to approximate the partial pressures shown in Table One:

| Condition | $P_{Nitrogen}$ | $P_{Oxygen}$ | $P_{Water}$ | $\Sigma P_i$ |
|---|---|---|---|---|
| Inside hard disk drive (50% RH, T = 50°) | 0.742 | .0197 | 0.061 | 1 |
| 15X compression | 11.13 | 2.96 | 0.61 | 15 |
| After water condensation | 11.13 | 2.96 | 0.12 | 14.21 |

Table One shows approximate pressures in atmospheres of the primary gaseous components inside a hard disk drive 10 at assumed ambient conditions in row one, in a compression zone between the air bearing surface 92 and a rotating disk surface 120 near the slider 90 trailing edge TE in the second row and in the compression zone after the coalescence of the water vapor into liquid water in the third row.

A 10× compression ratio is considered typical for the compression zone of an air bearing. Assuming the saturation vapor pressure at a given temperature is independent of external pressure, the water vapor in the compression zone will tend to become supersaturated. Water molecules flowing under the slider 90 are thermodynamically driven to coalesce until the partial pressure of water in the compression zone is reduced to $P = P^o$. In the present example, coalescence of the water vapor results in a 5% drop in the total pressure as shown in Table 1. This condensation process will result in lower flying height FH.

FIG. 1B shows the effects for the higher pitch angle PA and FIG. 1C shows the effects for the lower pitch angle PA when a slider 90 is flying above the disk surface 120 at 70% Relative Humidity at various rotational rates as shown along the horizontal axis in Revolutions Per Minute (RPM). In further detail:

In FIG. 1B, trace 910 represents the effect on the flying height or vertical position Vp for a temperature reading 170T of 25° C., trace 912 for a temperature reading of 50° C. and trace 914 for a temperature reading of 70° C.

In FIG. 1C, trace 920 represents the effect on the flying height or vertical position Vp for a temperature reading 170T of 25° C., trace 922 for a temperature reading of 50° C. and trace 924 for a temperature reading of 70° C.

Friction induced pitch/roll torques were also applied when minimum flying height is less than 4 nm glide height 902 in the simulations.

Comparing FIG. 1B with the high pitch angle PA to FIG. 1C with the low pitch angle, the simulation results indicate that while the delay in take-off was not significant for the high pitch case, take-off for the low-pitch case was delayed until RPM exceeded 10,000 RPM. This implies that appropriate adjustment of pitch angle during take-off can reduce contact duration substantially, which will increase reliability of CSS hard disk drive 10 by providing less possibility of contact-induced degradation of the read-write head 94. Though not shown here, this simulation result is consistent with experimental results.

While methods exist for detecting flying clearance change when the slider is flying without using sensors directly measuring that clearance, they cannot be applied while starting and stopping, because read-write head 94 located on the slider 90 cannot read data during starting and stopping. To implement proactive pitch angle adjustment, avoiding detrimental delayed Head Disk Interface (HDI) contacts while starting and stopping (take-off and touch down), requires knowing the environmental conditions within the CSS hard disk drive 10 such as temperature, humidity and air pressure.

Currently a typical CSS hard disk drive 10 typically includes an internal temperature sensor 16T, and operates by adapting to the temperature reading 170T from the sensor. The invention's CSS hard disk drive additionally includes an air pressure sensor 16P and a humidity sensor 16H. The temperature reading 170T, humidity reading 170H and air pressure reading 170P from these sensors enable the embedded circuit 500 to determine in-situ environmental conditions of the CSS hard disk drive, and determine which drive operations may be affected by these environmental readings, and adapt those operations accordingly. This is true for starting, stopping, as well as flying.

By utilizing these sensors, the late take-off problems shown in FIG. 1C may be effectively resolved. Early take-off for a slider 90 with a low pitch air bearing surface 92 can overcome the high humidity condition by changing the pitch angle PA through first asserting 710 the pitch actuation control signal PACS. Late touchdown for the slider with a low pitch air bearing surface can overcome the high humidity condition by changing the pitch angle PA through second asserting the pitch actuation control signal.

The method may further include third asserting 714 the pitch actuation control signal PACS during a track following process based upon the temperature reading 170T, the pressure reading 170P and the humidity reading 170H.

As used herein, there are two processes typically associated with accessing a track 122 on the disk surface 120. First, the slider 90 must be positioned close enough to the track 122 so that the read-write head 94 may access the track, and then the slider must be kept close enough that the access operation may be performed. The first is known as the track seek process and the second as track following.

Figure 1D:
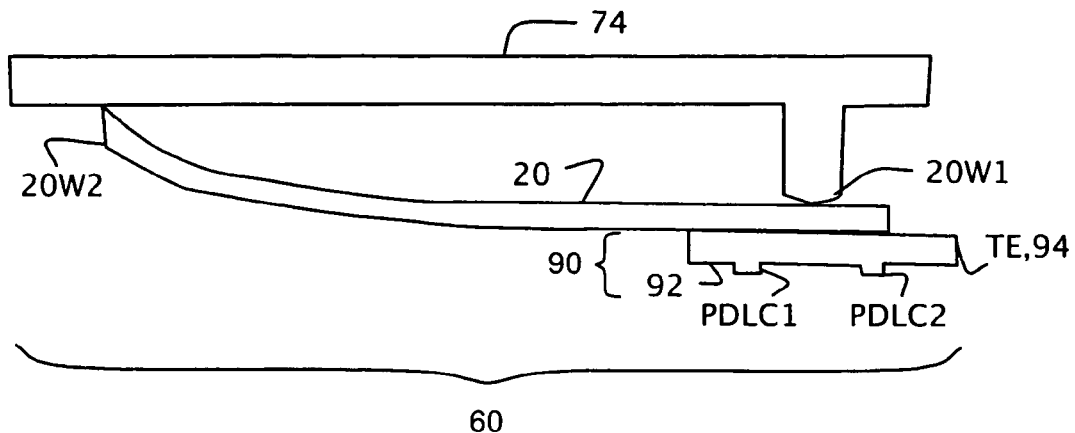

This adapting the pitch angle PA of the slider 90 to the rotating disk surface 120-1 reduces the probability of undesirable pad contacts with the disk surface under various altitude and humidity conditions which will now be discussed in detail with regards FIGS. 1D to 1F and have been incorporated from the parent patent application:

As shown in FIG. 1D, the bottom surface of the flexure finger 20 may typically be glued to the top surface of the slider 90, allowing the slider freedom of motion in both pitch and roll directions. The sliders typically used in a CSS hard disk drive 10 typically use at least one pad PDLC applied to the air bearing surface 92 to reduce stiction during start-up by decreasing the nominal contact area between the slider and the disk surface 120-1.

The typical height of the pad PDLC above the air bearing surface 92 is between 25 and 30 nanometers (nm) and a slider 90 may include more than five pads on the air bearing surface. The location and height of the pads are constrained by several performance and/or reliability requirements. The pads often need to be located so as to minimize interference with the disk surface 120-1 when the slider is flying above the rotating disk surface during normal access operations, for instance, by one or more of the pads contacting the rotating disk surface. While it is good to locate the pads near the trailing edge TE to minimizing tipping, the closer the pads are to the trailing edge, the greater the chance of pad contact with the rotating disk surface.

Figure 1E:
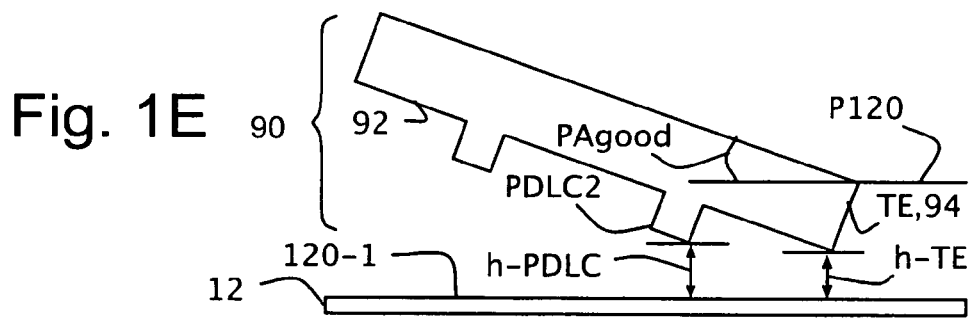
Figure 1F:
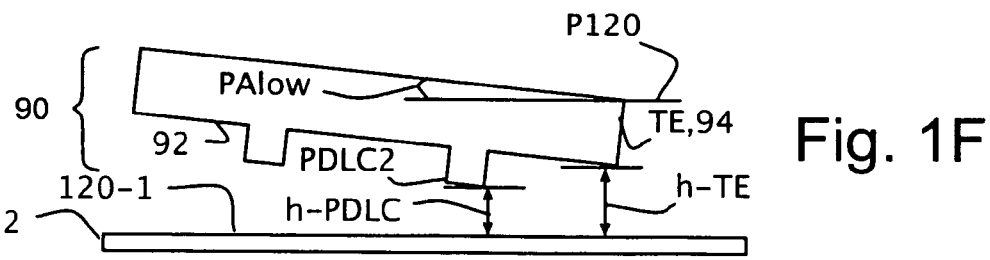

In normal ambient operating conditions, as shown in FIG. 1E, the pitch angle PA is a good pitch angle PAgood, which is enough to make minimum clearance location at read-write head 94 location, which is close to the trailing edge TE. However, as shown in FIG. 1F, when the pitch angle drops to a shallow pitch angle PAlow due to low pressure and/or high humidity conditions, this can result in undesirable "early" pad contact with the rotating disk surface 120-1. The reason why this pad contact is undesirable is that if there was no pitch angle drop, as shown in FIG. 1E, the minimum clearance location still would be at trailing edge and not at the pads, and there would be more margin between the flying height at trailing edge h-TE and the flying height at pad h-PDLC making it unlikely that there would be contact between the slider and the rotating disk surface, unless the altitude and/or the humidity conditions change for the worse. Consequently, the inventors realized that the pitch angle needed to be adjusted when the CSS hard disk drive 10 encounters certain altitude and humidity conditions.

The method may further include one of the following:

Fourth asserting 716 the pitch actuation control signal PACS for at least part of the track seek process.

Or fifth asserting 718 the pitch actuation control signal for at least part of the track seek process based upon the temperature reading 170T, and/or the pressure reading 170P and/or the humidity reading 170H.

Another embodiment of the invention includes an embedded circuit 500 using an embedded processor 510 as shown in FIGS. 13C, 13D, and 14A to 15, implementing the method within the CSS hard disk drive 10. The embedded processor receives the temperature reading 170T from the temperature sensor 16T, the pressure reading 170P from the air pressure sensor 17P and the humidity reading 170H from a humidity sensor 17H. Also:

The embedded processor may first assert the pitch actuation control signal PACS for at least part of the take-off process based upon the temperature reading, the pressure reading, and the humidity reading.

And/or the embedded processor may second assert the pitch actuation control signal for at least part of the touchdown process based upon the temperature reading, the pressure reading, and the humidity reading.

The embedded processor 510 may preferably include at least one instance 510E of a controller 506. As used herein, each controller receives at least one input 506I, maintains and updates at least one state 506S and generates at least one output 506O based upon at least one of the inputs and/or at least one of the states as shown in FIG. 13E.

Figure 13A:
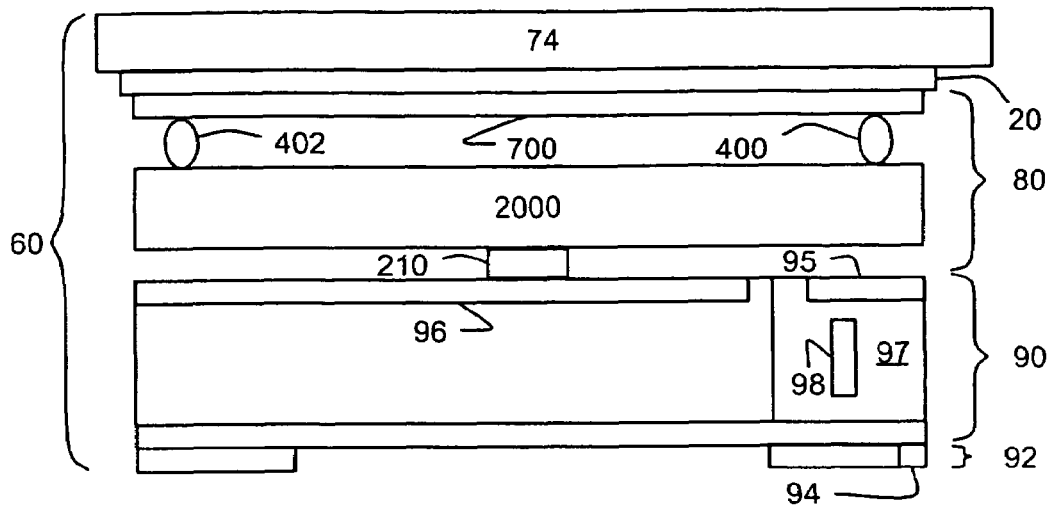
FIGS. 13A and 13B show an example of a micro-actuator assembly employing an electrostatic effect.
Figure 13B:
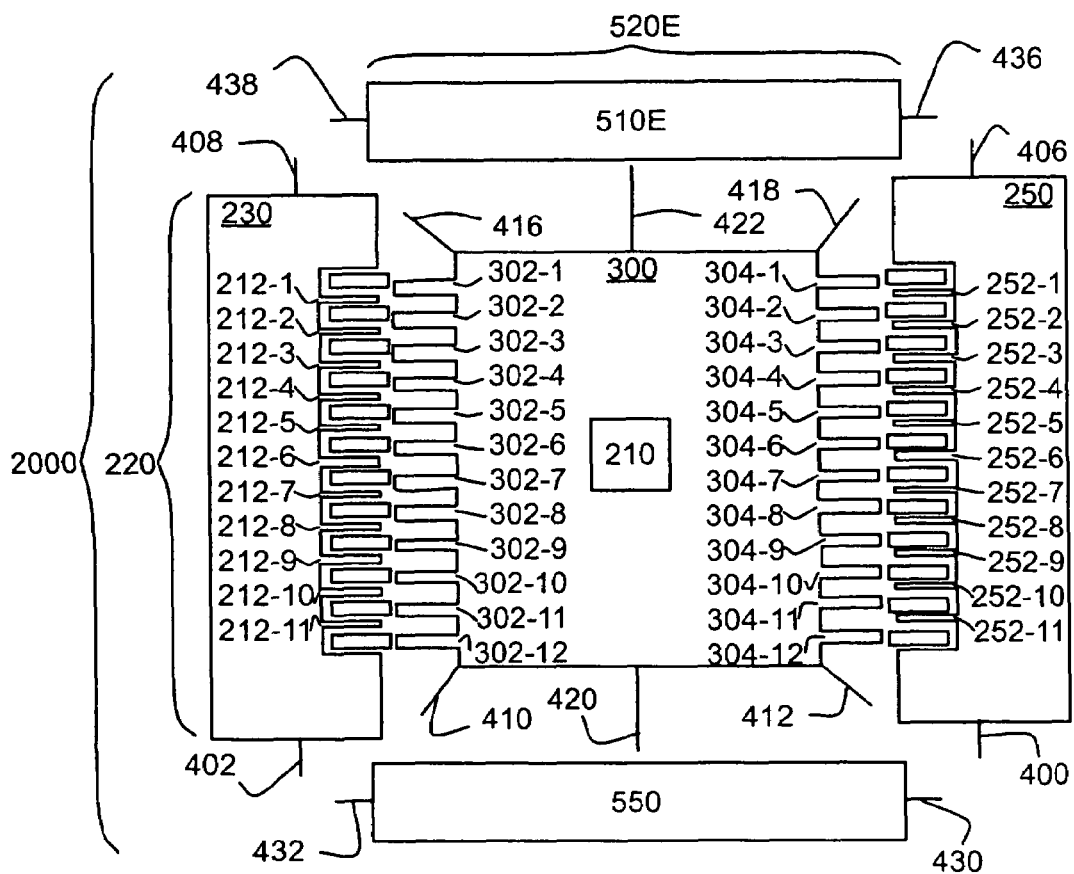

At least one state 506S includes at least one of a non-redundant digital representation NDR and/or a redundant digital representation RDR and/or an analog representation ADR, as shown in FIG. 13F. A non-redundant digital representation frequently comprises at least one digit, which may frequently represent a bit with values of 0 and 1, a byte including eight bits, and so on. Often non-redundant digital representations include representations of 16 bit integers, 32 bit integers, 16 bit floating point numbers, 32 bit floating point numbers, 64 bit floating point numbers, strings of bytes, fixed length buffers of bytes, integers, First-In-First-Out (FIFO) queues of such representations, and so on. Any, all and more than just these examples may be used as non-redundant digital representations of the state of a controller 506.

A redundant digital representation RDR of a non-redundant digital representation NDR may include a numerically redundant digital representation NRR, an error control representation ECR and/or a logically redundant representation LLR, as shown in FIG. 13G. The following examples will serve to illustrate these redundant representations:

An example of a numerically redundant representation NRR may be found in a standard multiplier, which will often use a local carry propagate adder to add three or four numbers together to generate two numeric components which redundantly represent the numeric result of the addition.

An example of an error control representation ECR will frequently use the non-redundant digital representation NDR and an additional component formed as the function of the non-redundant digital representation. If this error control representation is altered by a few number of bits, a error correcting function reconstructs the original non-redundant digital representation. Quantum computers are considered as controllers which will tend to use this kind of error control representations for at least some states.

An example of a logically redundant representation LRR may be found in the definition and implementation of many finite state machines, which often require that a single state be represented by any member of a multi-element set of non-redundant digital representation NDR. Often the members of this set differ from at least one other member of the set by just one bit. Such logically redundant representations are often used to insure that the generation of glitches is minimized.

As used herein, a controller 506 may include an instance of a finite state machine FSM as shown in FIG. 13H, and/or include an instance of an inference engine IE as shown in FIG. 13I and/or an instance of a neural network NN as shown in FIG. 13J and/or an instance of a computer 600 directed by a program system 800 including program steps or operations residing in a memory 604 accessibly coupled 602 to the computer as shown in FIG. 15. As used herein, a computer includes at least one instruction processor and at least one data processor, where each of the data processors is directed by at least one of the instruction processors.

Figure 21A:
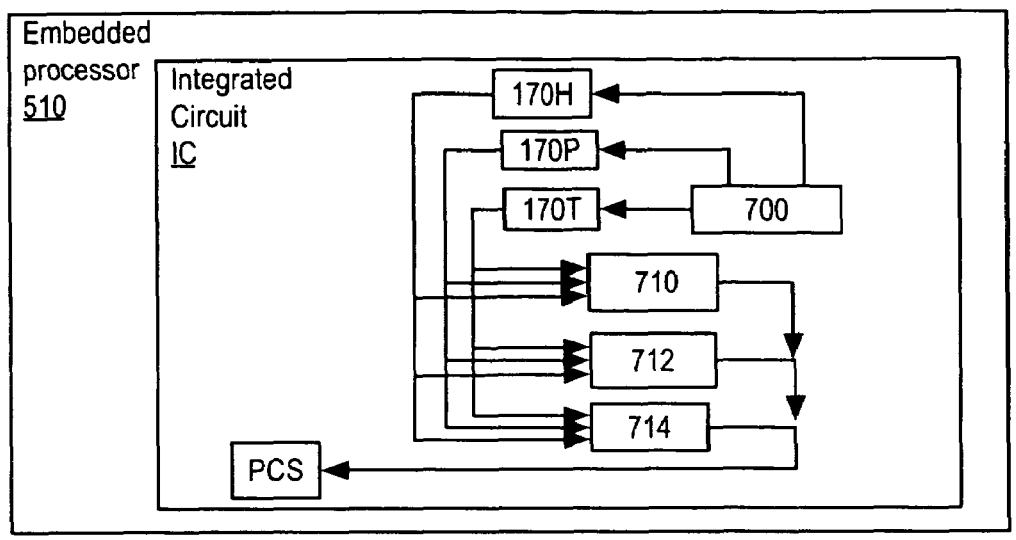
FIG. 21A shows the embedded processor of the previous Figure including an integrated circuit containing all the members of the invention's means group.

The embedded processor 510 may include means for receiving 700 the temperature reading 170T from the temperature sensor 16T, the pressure reading 170P from the air pressure sensor 16P and the humidity reading 170H from a humidity sensor 16H, as shown in FIGS. 14A, 14B and 21A. The embedded processor may further include at least one of the following:
  Means for first asserting 710 the pitch actuation control signal PACS for at least part of the take-off process based upon the temperature reading, the pressure reading, and the humidity reading.
  And/or means for second asserting 712 the pitch actuation control signal for at least part of the touchdown process based upon the temperature reading, the pressure reading, and the humidity reading.

As used herein, asserting the pitch actuation control signal PACS may be implemented with a variety of mechanisms. Here are two examples:
  A pitch control signal PCS may be asserted within the embedded circuit 500, possibly within the embedded processor 510, and delivered to a preamplifier 24 in the head stack assembly 50, where the pitch actuation control signal is assertively generated and provided to the pitch actuator PAA, as shown FIGS. 14A and 14B.
  Alternatively, the embedded circuit and possibly the embedded processor may include a pitch actuator driver 620 which asserts the pitch actuation control signal for delivery to the head stack assembly, which then provides it to the pitch actuator as shown in FIG. 15.

The embedded processor 510 may further implement the method by including means for third asserting 714 the pitch actuation control signal PACS during a track following process based upon the temperature reading 170T, the pressure reading 170P and the humidity reading 170H.

The embedded processor 510 may further include one of the following:
  Means for fourth asserting 716 the pitch actuation control signal PACS for at least part of the track seek process.
  Or means for fifth asserting 718 the pitch actuation control signal for at least part of the track seek process based upon the temperature reading 170T, and/or the pressure reading 170P and/or the humidity reading 170H.

The members of the means group consist of the means for receiving 700, the means for first asserting 710, the means for second asserting 712, the means for third asserting 714, the means for fourth asserting 716, and the means for fifth asserting 718. Any of these members may be implemented by at least one instance of a computer 600 directed by a program system 800 including program steps residing in a memory 604 accessibly coupled 602 to the computer as shown in FIG. 15, a finite state machine 720 as shown in FIG. 17B, an inferential engine 722 as shown in FIG. 17C and/or a neural network 724 as shown in FIG. 17D.

Some of the following figures show flowcharts of at least one method of the invention, possessing arrows with reference numbers. These arrows will signify of flow of control and sometimes data supporting implementations including:
  at least one program operation or program thread executing upon a computer 600,
  at least one inferential link in an inferential engine IE,
  at least one state transitions in a finite state machine FSM,
  and/or at least one dominant learned response within a neural network NN.

The operation of starting a flowchart is designated by an oval with the text "Start" in it, and refers to at least one of the following:
  Entering a subroutine in a macro instruction sequence in a computer 600.
  Entering into a deeper node of an inferential graph of an inference engine IE.
  Directing a state transition in a finite state machine FSM, possibly while pushing a return state.
  And triggering a list of at least one neuron and/or at least one synaptic connection in a neural network NN.

The operation of termination in a flowchart is designated by an oval with the text "Exit" in it, and refers to the completion of those operations, which may result in at least one of the following:
  return from a subroutine in a computer 600,
  traversal of a higher node in the inferential graph of an inference engine IE,
  popping of a previously stored state in a finite state machine FSM,
  and/or return to dormancy of the firing neurons of the neural network NN.

Figure 16A:
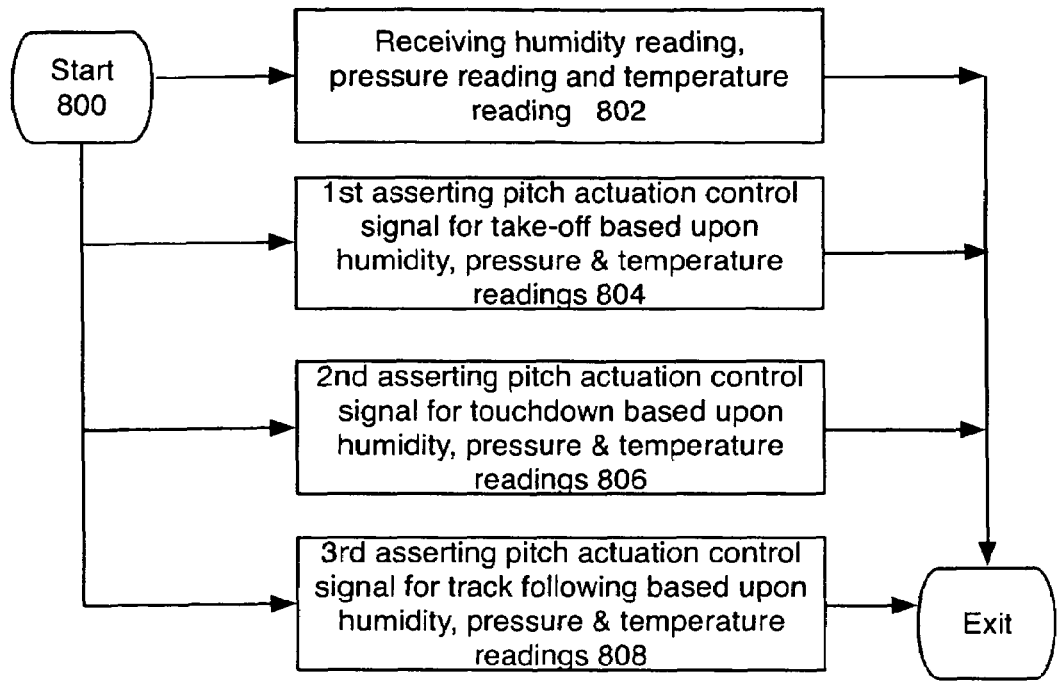
FIGS. 16A to 17D show flowcharts of some details of the aspects of the program system of FIG. 15.

The program system 800 may preferably include at least one of the following programming steps as shown in FIG. 16A:
  Operation 802 supports receiving 700 the temperature reading 170T from the temperature sensor 16T, the pressure reading 170P from the air pressure sensor 16P and the humidity reading 170H from a humidity sensor 16H. Operation 802 may at least partly implement the means for receiving 700.
  Operation 804 supports first asserting 710 the pitch actuation control signal PACS for at least part of the take-off process based upon the temperature reading, the pressure reading and the humidity reading. Operation 804 may at least partly implement means for first asserting 710.
  Operation 806 supports second asserting 712 the pitch actuation control signal for at least part of the touchdown process based upon the temperature reading, the pressure reading and the humidity reading. Operation 806 may at least partly implement means for second asserting 712.

Figure 6A:
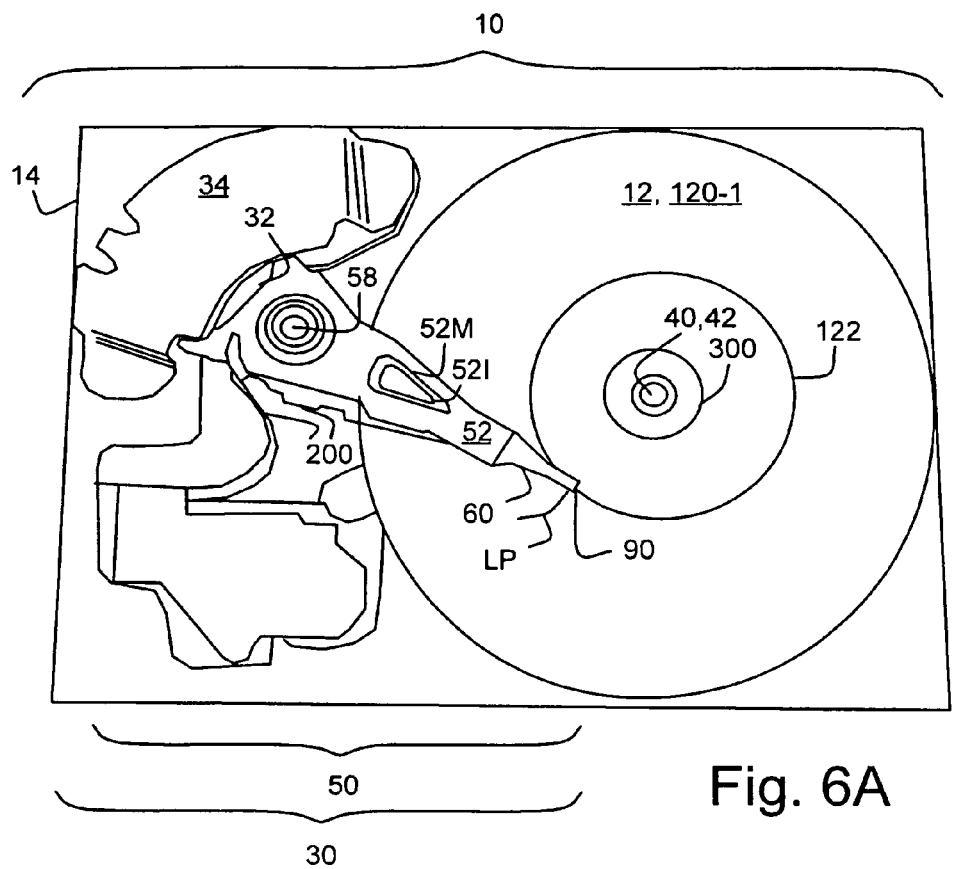
FIGS. 6A and 6B show various aspects of the invention's CSS hard disk drive.

The program system 800 as shown in FIG. 16A may preferably include operation 808, which supports third asserting 714 the pitch actuation control signal for the track following process based upon the temperature reading 170T, the pressure reading 170P and the humidity reading 170H:
  Operation 808 may at least partly implement means for third asserting 714.
  Operation 808 may further include directing the voice coil motor 30 including the head stack assembly 50 to laterally position LP the slider 90 for its read-write head 94 to follow a track 122 on the rotating disk surface 120-1 as shown in FIGS. 6A and 15.

Directing the voice coil motor may preferably include stimulating a voice coil driver 35 to generate a voice coil stimulus signal 22 provided to the voice coil 20. The voice coil stimulus signal is a time-varying electric signal, which induces a time varying electromagnetic field in the voice coil. This caused the voice coil to be attracted and repelled by the fixed magnet 34, inducing the head stack 50 to pivot about the actuator pivot 58, moving the slider 90 and its read-write head 94 above the rotating disk surface 120-1. The voice coil motor moves the slider through the head gimbal assembly 60 coupling to the actuator arm 52, which is part of the head stack.

Operation 808 may further preferably include directing a micro-actuator assembly 80 to further laterally position the slider using a lateral position signal 82 possibly by using a lateral position signal driver 28.

It may be preferred that the slider 90 and/or the micro-actuator assembly 80 include a vertical micro-actuator. Currently the slider is preferred to include the vertical micro-actuator 98, which is often preferred to use a thermal mechanical effect, but may alternatively use a piezoelectric effect or an electrostatic effect, to alter the vertical position Vp, which may be preferably be viewed as the flying height at the trailing edge h-TE. Operation 808 may also further include generating a vertical as shown in FIG. 6A actuation signal VcAC, which may be generated by a vertical driver 610.

The means for third asserting 714, as shown in FIG. 14B, may further include using the humidity reading 170H to create a humidity estimate 180H, the pressure reading 170P to create a pressure estimate 180H, the temperature reading 170T to create a temperature estimate 180T, means for determining 702 the pitch angle estimate PAE based upon the humidity, pressure, and temperature estimates and means for asserting 704 a pitch control signal PCS based upon the pitch angle estimate.

Figure 16B:
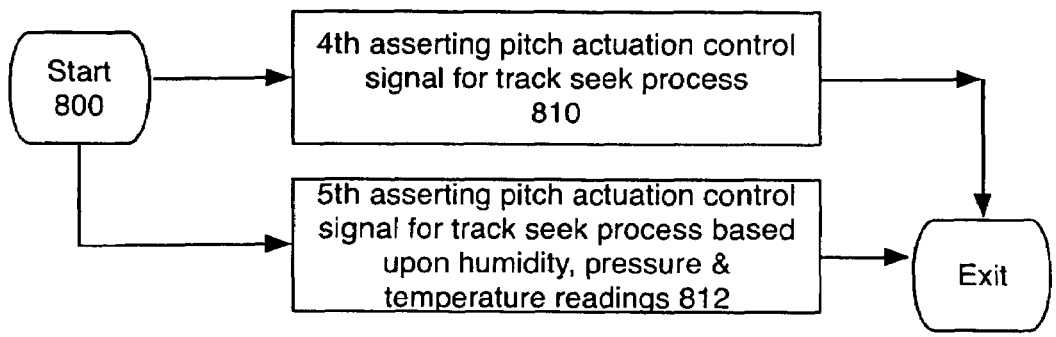

The program system 800 may further include one of the operations shown in FIG. 16B:
Operation 810 supports fourth asserting 716 the pitch actuation control signal PACS for at least part of the track seek process, or
Operation 812 support fifth asserting 718 the pitch actuation control signal for at least part of the track seek process based upon at least one of the humidity reading 170H, and/or the pressure reading 170P, and/or the temperature reading 170T.

Figure 17A:
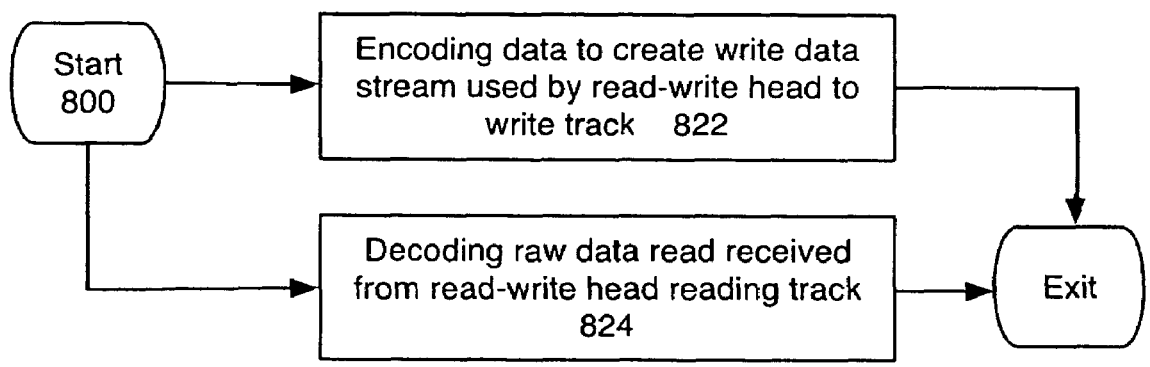
Figure 17B:
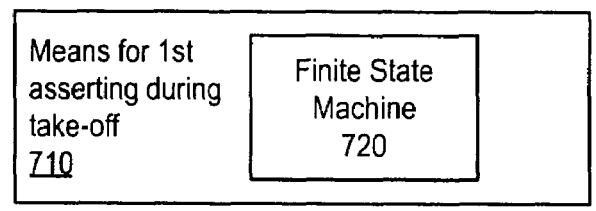
Figure 17C:
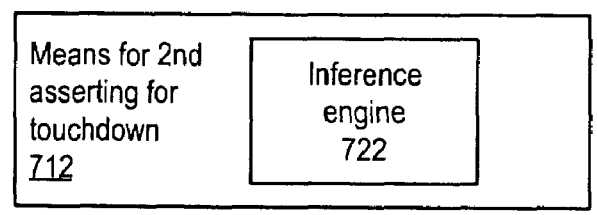
Figure 17D:
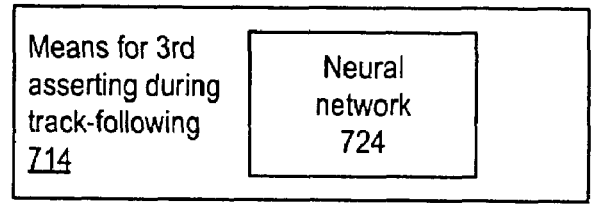

The program system 800 may direct at least one of the instances of the computer 600, may include at least one of the following program steps as shown in FIG. 17A:
Operation 822 supports encoding track data 122D for use by the read-write head to write to the track.
And/or operation 824 supporting decoding a raw data 122R received from the read-write head reading the track.

The embedded circuit 500 may preferably include an integrated circuit IC as shown in FIG. 21A, containing the means for receiving 700 the humidity reading 170H, the pressure reading 170P and the temperature reading 170T, and at least one of the following:
the means for first asserting 710 the pitch actuation control signal PACS for at least part of the take-off process, and/or
the means for second asserting 712 the pitch actuation control signal for at least part of the touchdown process, and/or the means for third asserting 714 the pitch actuation control signal for at least part of the track following process.

The integrated circuit IC may further include:
the means for fourth asserting 716 the pitch actuation control signal PACS for at least part of the track seek process, or
the means for fifth asserting 718 the pitch actuation control signal for at least part of the track seek process based upon at least one of the humidity reading 170H, and/or the pressure reading 170P, and/or the temperature reading 170T.

These means may be at least partly implemented by the program system 800 as shown in FIG. 16B. Operation 810 may at least partly implement the means for fourth asserting 716. Operation 812 may at least partly implement the means for fifth asserting 718.

An embodiment of the invention includes manufacturing the embedded processor 510 by providing the means for receiving 700 and at least one of the means for first asserting 710 the pitch actuation control signal PACS for at least part of the take-off process and/or the means for second asserting 712 the pitch actuation control signal for at least part of the touchdown process to create the embedded processor. The invention includes the embedded processor as a product of this process. The embedded processor may be produced as an integrated circuit IC, as shown in FIG. 21A.

Another embodiment of the invention may include manufacturing the embedded circuit 500 by providing the embedded processor 510 to create the embedded circuit. The invention includes the embedded circuit as a product of this process.

Figure 18:
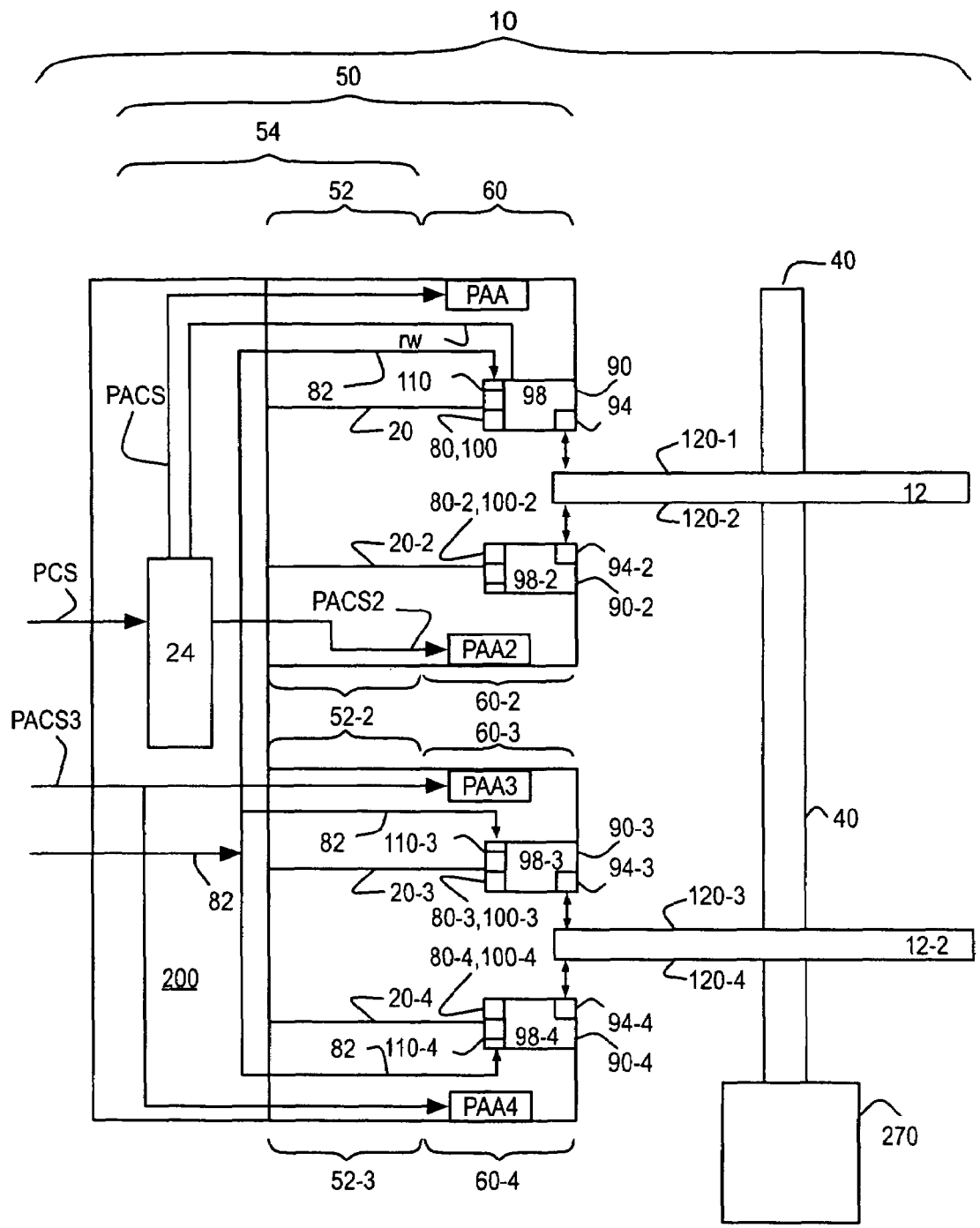
FIG. 18 shows some details of the CSS hard disk drive of the previous Figures.
Figure 19A:
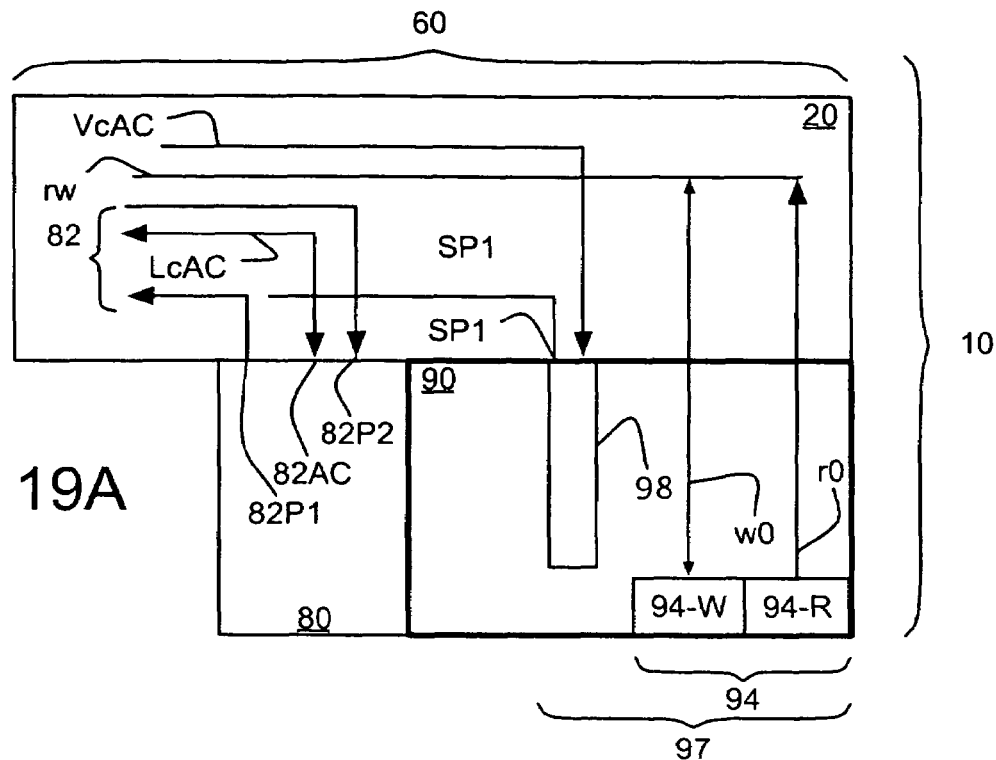
FIGS. 19A to 20B show some further details of the invention's head gimbal assembly.
Figure 19B:
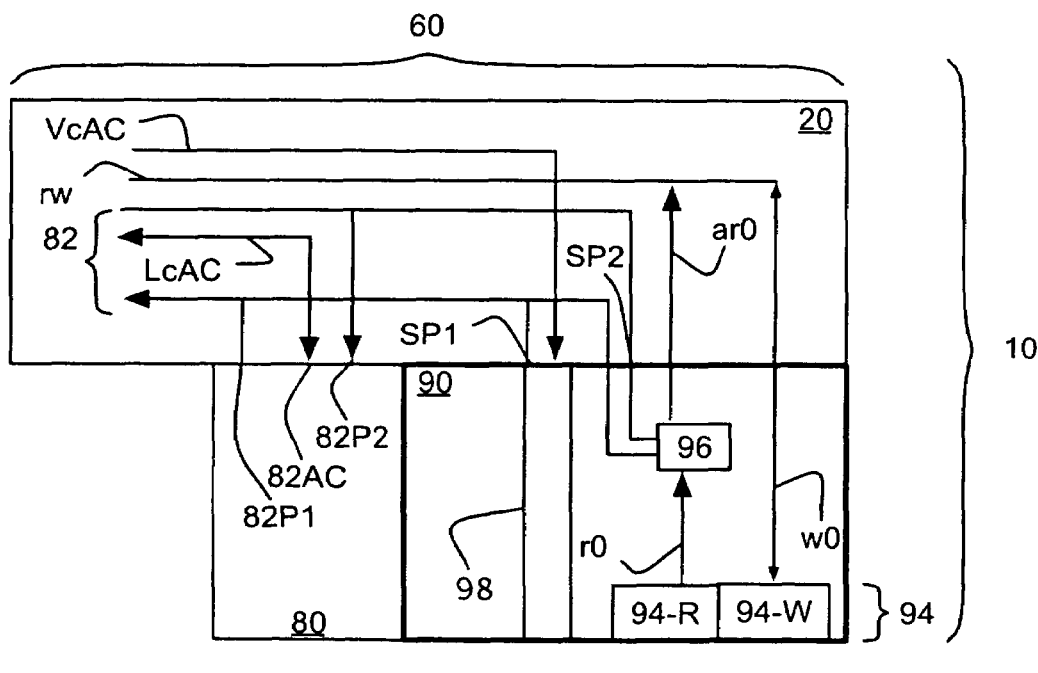
Figure 20A:
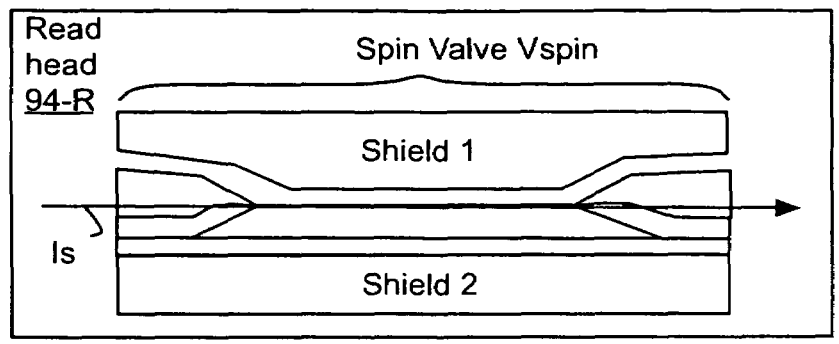
FIGS. 20C and 20D show some details of the track on the disk surface of the previous Figures.
Figure 20B:
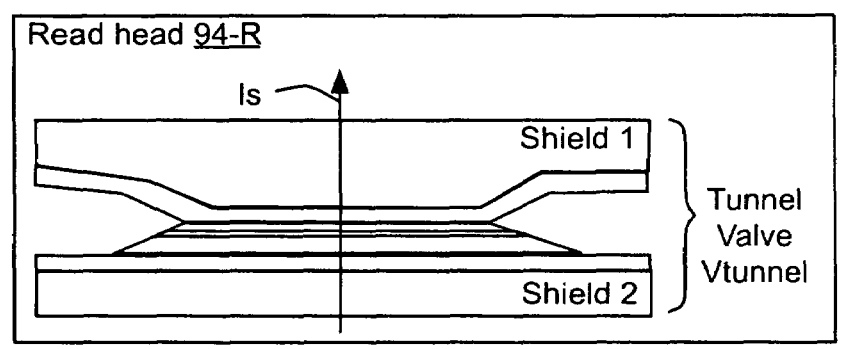
Figure 20C:
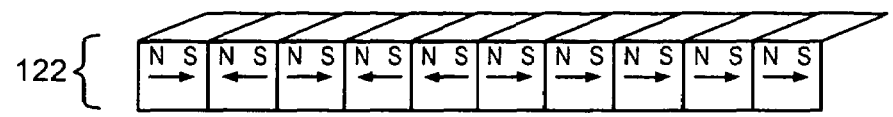
Figure 20D:
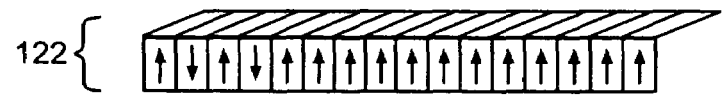

In certain preferred embodiments of the invention's CSS hard disk drive 10, the embedded circuit 500 couples to the head stack assembly 50. The embedded circuit includes a matching coupling MAC to the embedded circuit coupling ECC for providing the pitch actuation control signal PACS as shown in FIGS. 14A and 14B. In FIGS. 15 and 18, the embedded circuit coupling and the matching coupling are not separately shown. Instead the signals between the couplings are shown on the left hand side of these Figures. The matching coupling may include one of the following: the matching coupling may be presented the pitch actuation control signal PACS by a pitch actuator driver 620 by a pitch control signal PCS, or the matching coupling may present the pitch control signal to the embedded coupling to provide the pitch actuation control signal.

The manufacturing the embedded circuit 500, may further include one of the following: electrically coupling the matching coupling MAC and the integrated circuit IC to create the embedded circuit for providing the pitch control signal PCS through the matching coupling, or electrically coupling the matching coupling, the pitch actuator driver 620, and the integrated circuit to create the embedded circuit for providing the pitch actuation control signal PACS through the matching coupling.

Another embodiment of the invention includes the CSS hard disk drive 10 further implementing the method and including a head stack assembly 50 coupling to the embedded circuit 500 to deliver the pitch actuation control signal PACS to a pitch actuator PAA in at least one head gimbal assembly 60 for altering the pitch angle PA of the slider 90 to the disk surface 120 it accesses and a coupling of a humidity sensor 16H, a temperature sensor 16T and an air pressure sensor 16P to the embedded circuit to provide the humidity reading 170H, the temperature reading 170T, and the pressure reading 170P used in the method.

The CSS hard disk drive 10 of FIGS. 14A to 15 may use at least any pitch actuator PAA shown in FIGS. 2A to 5A. The invention operates a head gimbal assembly 60 by asserting a pitch actuation control signal PACS provided to at least one electrical coupling of a pitch actuator PAA as shown in FIGS. 2A to 2D. The pitch actuator responds to the pitch actuation control signal by flexing the flexure finger 20 toward the load beam 74 to increase the pitch angle PA of the slider 90 to a disk surface 120-1. As previously stated, the slider includes at least one Pad with Diamond Like Carbon, which will frequently be referred to as a pad PDLC on an air bearing surface 92 for use in parking the slider on the disk surface in the CSS hard disk drive.

Figure 2A:
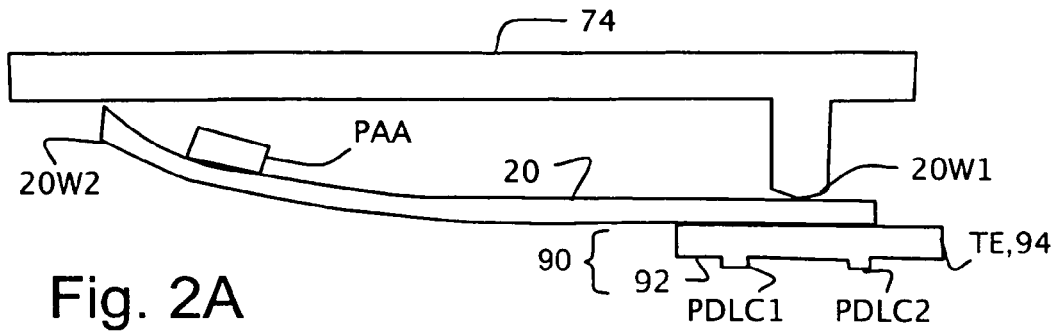
FIGS. 2A to 2D show the basic operation of the invention's head gimbal assembly include the invention's pitch actuator.
Figure 2B:
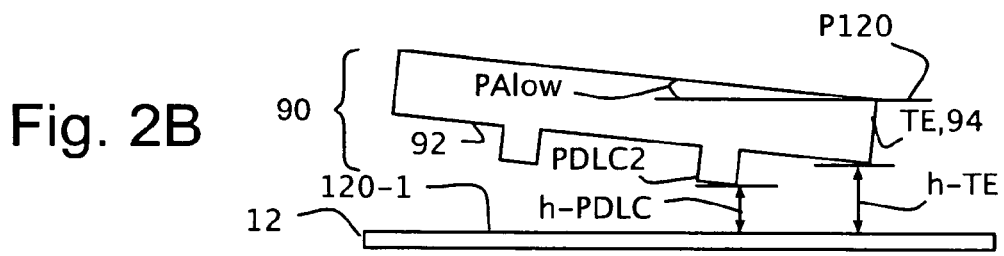
Figure 2C:
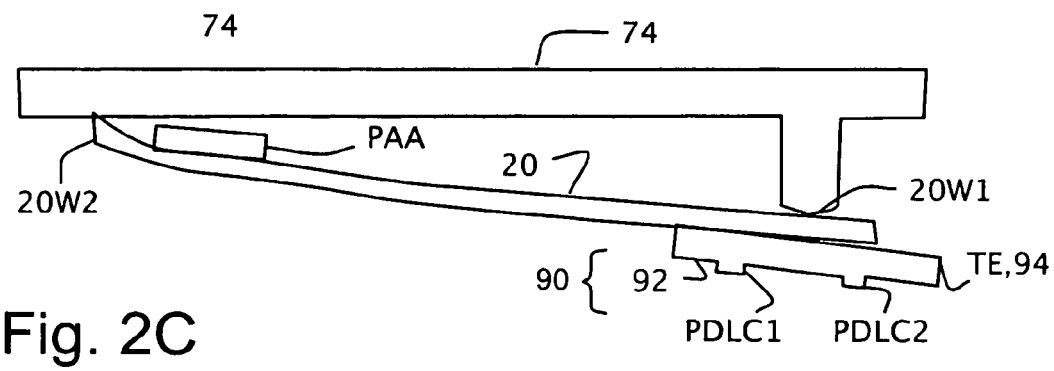
Figure 2D:
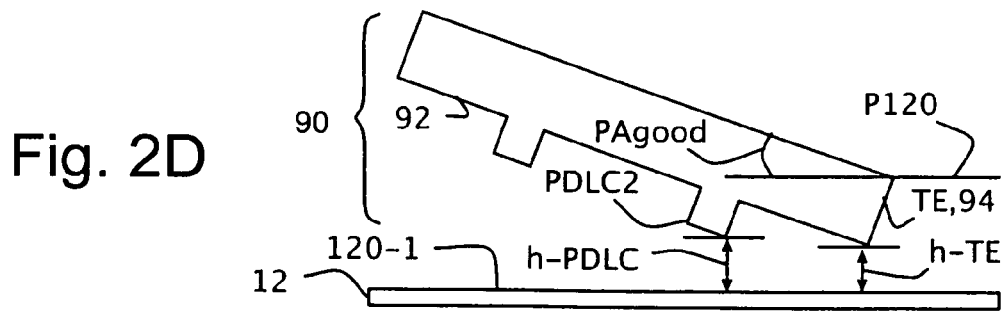

An example of the method of adjusting the pitch angle PA is shown in FIGS. 2A to 2D. To increase the pitch angle, the flexure finger 20 is attracted to the load beam 74. FIG. 2A shows the pitch actuator PAA inactive, and gravity and other ambient conditions tending to lower the flexure finger. In certain conditions, such as the low pressure of high altitude and/or high humidity, the pitch angle is too low, which is designated as shallow pitch angle PAlow, as shown in FIG. 2B. In such situations, the pad PDLC tends to have too high a probability of contacting the rotating disk surface 120-1, which can result in damage to the read-write head 94 and/or the disk surface. FIG. 2C shows the pitch actuator activated attracting the flexure finger to the load beam, and consequently increasing the pitch angle to a good pitch angle PAgood, as shown in FIG. 2D.

The head gimbal assembly 60 preferably supports this operation, and includes first coupling of the load beam 74 to the flexure finger 20 at a flexure coupling point 20W2, a second coupling of the load beam, the flexure finger and the slider 90 at a dimple 20W1, and the pitch actuator PAA coupling to the flexure finger between the flexure coupling point and the dimple. The flexure finger may include at least one pitch actuation control signal trace PACST for providing the pitch actuation control signal PACS to the pitch actuator.

The pitch actuator PAA may include an electrostatic coupling EC responding to the pitch actuation control signal PACS to urge the flexure finger 20 toward the load beam 74 to flex the flexure finger. The electrostatic coupling includes a first plate P1 coupled to the flexure finger interacting with a second plate P2 coupled to the load beam to attract the flexure finger to the load beam. The load beam may include the second plate. The flexure finger may include the first plate.

Figure 3A:
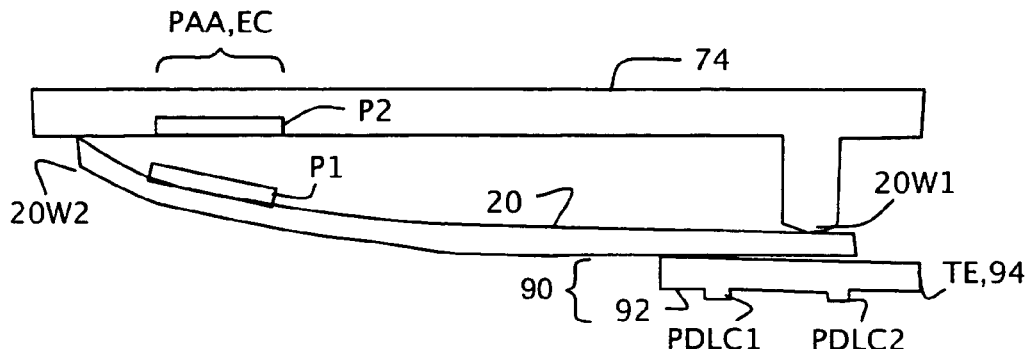
FIGS. 3A to 3D show the basic operation of the invention where the pitch actuator includes an electrostatic coupling.
Figure 3B:
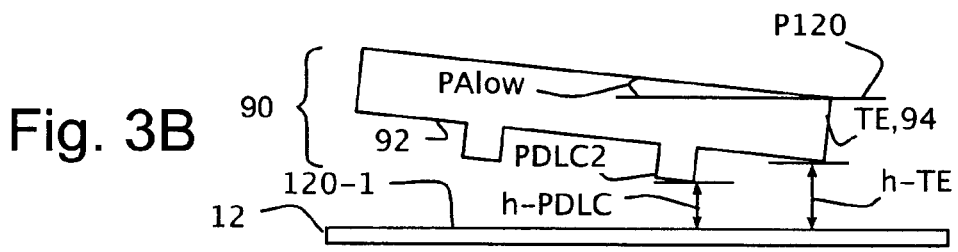
Figure 3C:
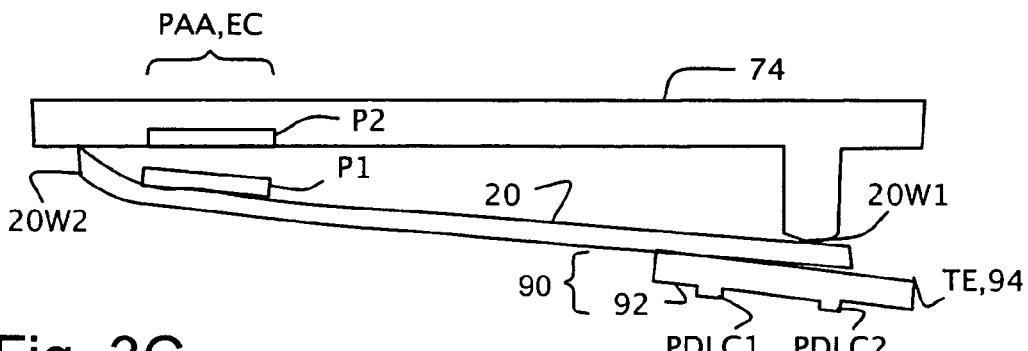
Figure 3D:
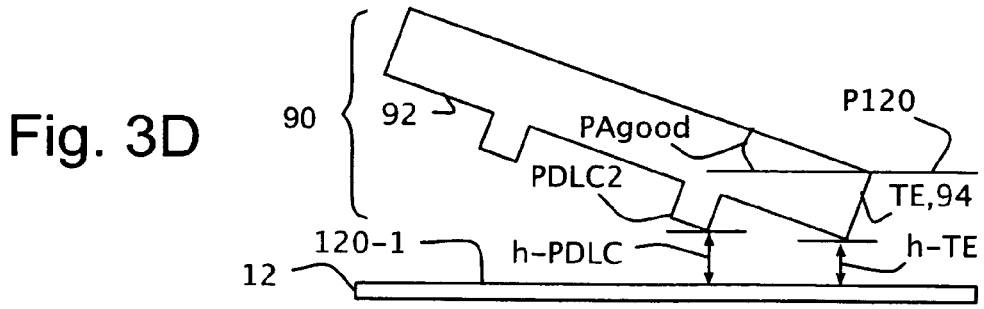

For example, it may be preferred to apply an electric field between the first plate P1 and the second plate P2 to generate an attractive electrostatic force, which will cause a higher pitch angle PAgood as shown in FIGS. 3C and 3D. This will ensure desirable early take-off even for the slider 90 including an air bearing surface 92 optimized for low pitch PA as shown in FIG. 1A. When lower pitch is desirable, repulsive electrostatic force may be generated. By analogy, the same proactive scheme can be applied at (high) altitude conditions when the air pressure is low. This proactive scheme is also applicable to optimizing touch down.

Also note that higher pitch is preferable during the take-off process when at least one pad PDLC is located closer to trailing edge TE. In such a case higher pitch reduces possibility of head disk interface contact effectively as well as early take-off. Appropriate adjustment scheme to drive environment, i.e., temperature, humidity and altitude, may vary in different CSS hard disk drives.

An example of the pitch actuator PAA including an electrostatic coupling EC is shown in FIGS. 3A to 3D. To increase the pitch angle PA, the flexure finger 20 is attracted to the load beam 74. FIG. 3A shows the electrostatic coupling is inactive, and gravity and other ambient conditions tending to lower the flexure finger. In certain conditions, the pitch angle is too low, which is designated as shallow pitch angle PAlow, as shown in FIG. 3B. In such situations, the pad PDLC tends to have too high a probability of contacting the rotating disk surface 120-1, which can result in damage to the read-write head 94 and/or the disk surface. FIG. 3C shows the electrostatic coupling activated, attracting the flexure finger to the load beam, and consequently increasing the pitch angle to a good pitch angle PAgood, as shown in FIG. 3D.

An embodiment of the invention's flexure finger 20 may include a first plate P1 arranged to electrostatically interact with a second plate P2 included in the invention's load beam 74. The invention's head gimbal assembly 60 includes the slider coupling point to the flexure finger to create an electrostatic coupling EC between the first plate and the second plate capable of attracting the flexure finger to the load beam. The head gimbal assembly also includes at least one pitch actuation control signal trace PACST electrically coupling to the first plate and possibly a second trace electrically coupling to the second plate to provide the electromagnetic force between the two plates, which creates the electrostatic field between them activating the electrostatic coupling EC.

The pitch actuator PAA may include a piezoelectric stack PZ coupling to the flexure finger 20 to urge the flexure finger toward the load beam 74 to flex the flexure finger, when the piezoelectric stack is stimulated by the pitch actuation control signal PACS.

Figure 4A:
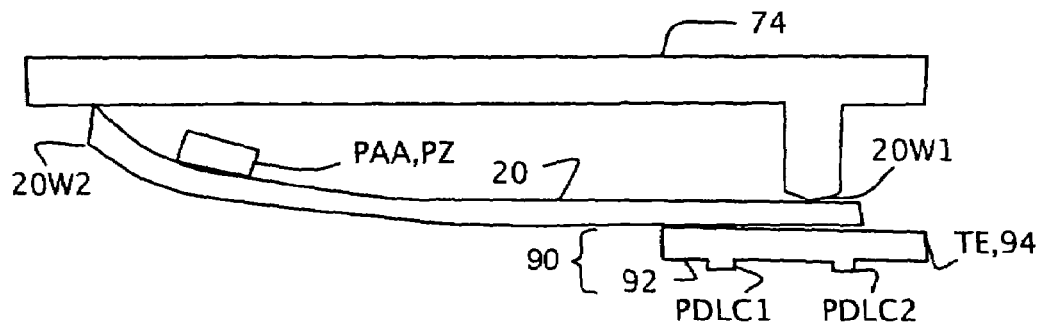
FIGS. 4A to 4C show the basic operation of the invention where the pitch actuator includes a piezoelectric stack.
Figure 4B:
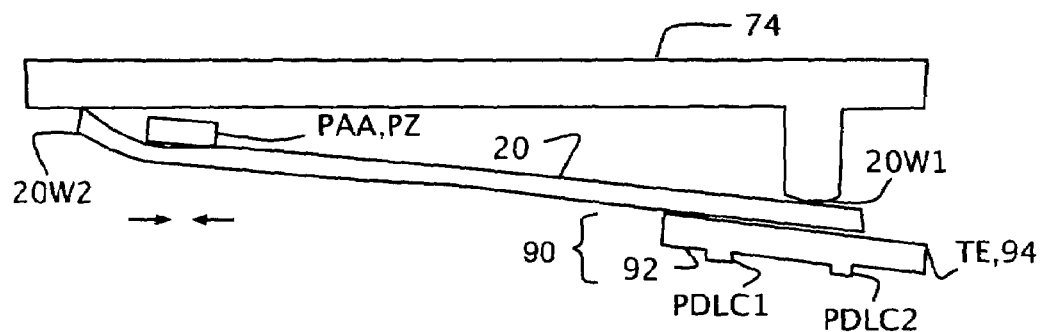
Figure 4C:
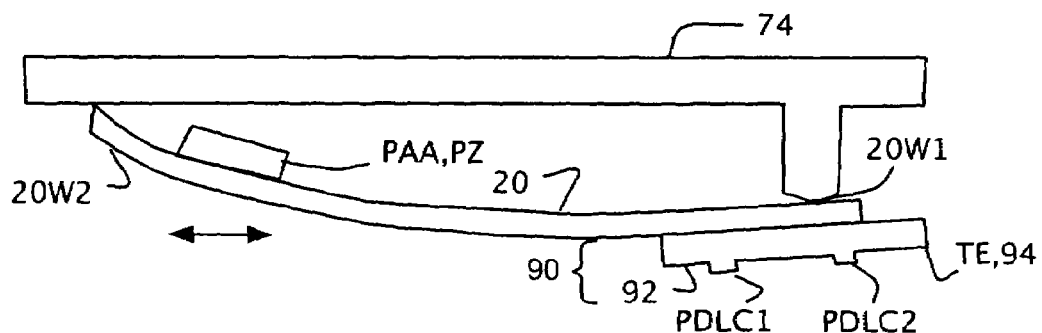
Figure 4D:
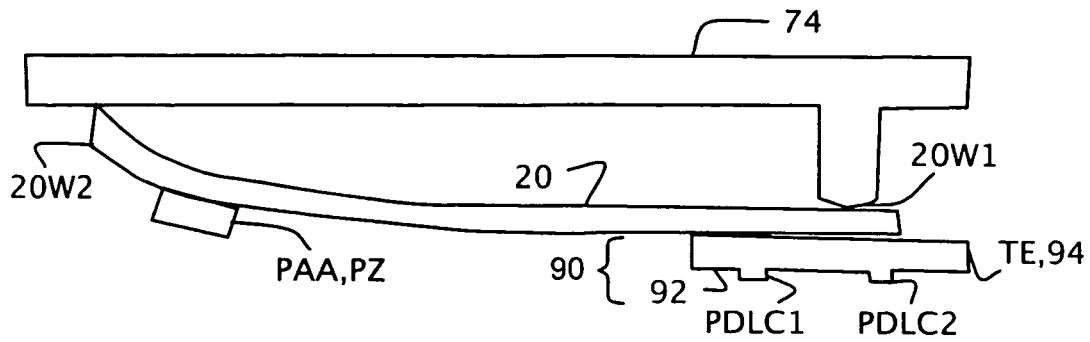
FIGS. 4D to 4F show the basic operation of the invention where the pitch actuator includes the piezoelectric stack coupling to the flexure finger toward the disk surface.
Figure 4E:
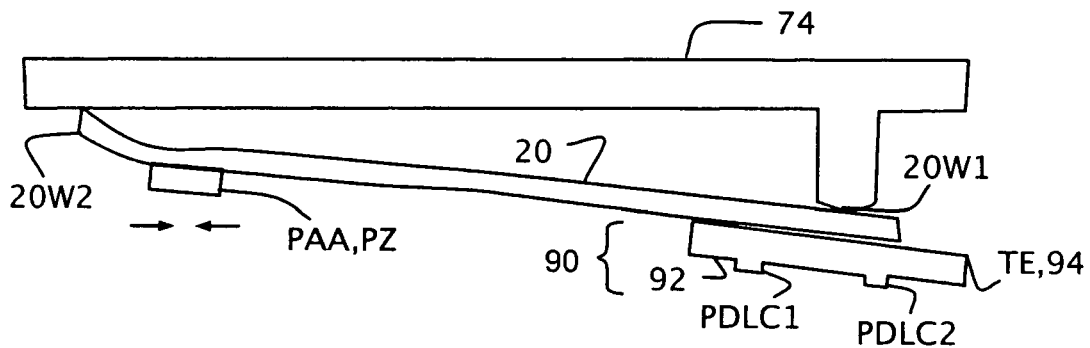
Figure 4F:
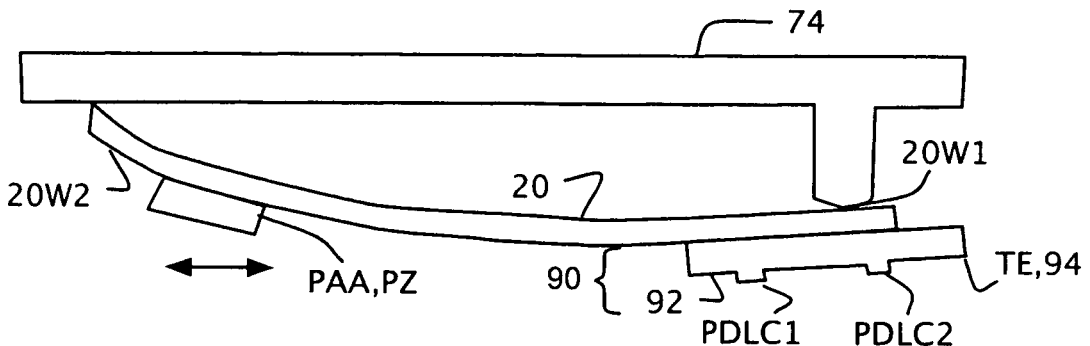

A first example of the pitch actuator PAA including the piezoelectric stack PZ is shown in FIGS. 4A to 4C with the piezoelectric stack coupled to the side of the flexure finger 20 toward the load beam 74. A second example shows the piezoelectric stack coupled to the side of the flexure finger away from the load beam in FIGS. 4D to 4F. FIGS. 4A and 4D show the piezoelectric stack inactive, and gravity and other ambient conditions tending to lower the flexure finger. FIGS. 4C and 4E show the piezoelectric stack activated, and be contracting attracting the flexure finger to the load beam. Additionally, FIGS. 4B and 4F show the piezoelectric stack expanding, moving the flexure finger away from the load beam and lowering the pitch angle.

In certain embodiments of the invention, lowering the pitch angle PA may be counterproductive, and the head gimbal assembly 60, in particular, the flexure finger 20 may provide exactly one trace, the pitch actuation control signal trace PACST to drive one of the two terminals of the piezoelectric stack, while the second terminal is tied to a shared ground, which may include at least part of the load beam. Something similar to this can also be done with embodiments employing the electrostatic coupling EC mentioned above.

Figure 12:
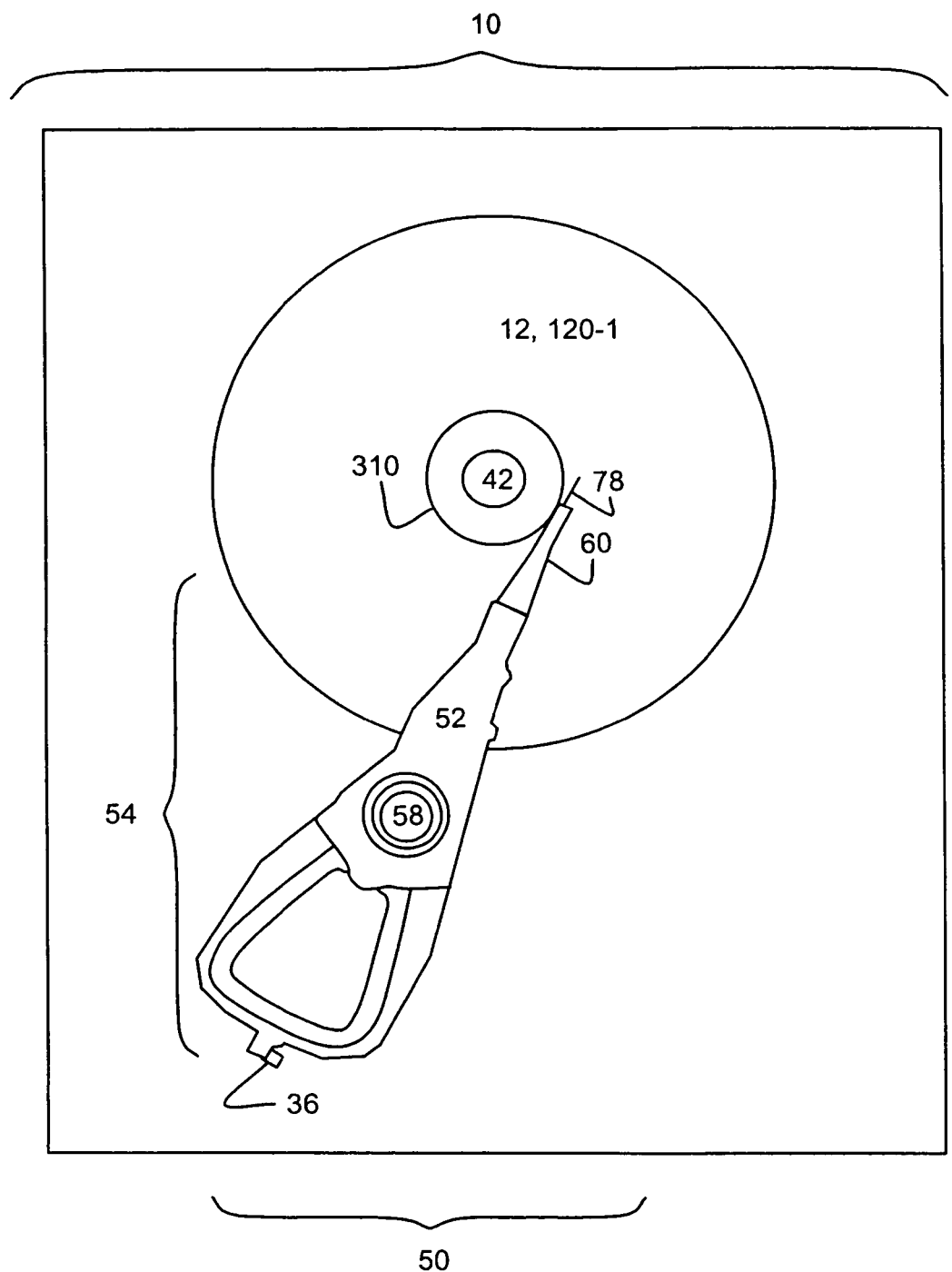

When in non-operational mode, the invention's CSS hard disk drive 10 parks the head stack assembly 50 with the head gimbal assemblies at the far inside diameter ID, shown in FIGS. 6A and 12, on the disk surfaces. The second load tab 78-2 contacts the first tab ramp of the disk spacer 310 engaging the second slider 90-2 into secure contact with the second disk surface 120-2. The second load tab 78-3 contacts the second tab ramp of the disk spacer engaging the third slider 90-3 into secure contact with the third disk surface 120-3. These tab ramps serve as a cam, contacting the load tabs to engage the sliders in secure contact with the disk surfaces no matter what the angular position of the head stack assembly or CSS hard disk drive. The sliders rest at the far inside diameter and because of the contact between the load tabs and tab ramps, are prevented from separating from the disk surfaces they rest on during a mechanical shock to the CSS hard disk drive.

In further detail, the second load tab 78-2 is included in the second head gimbal assembly 60-2. The third load tab 78-3 is included in the third head gimbal assembly 60-3. The head stack assembly 50 includes a first actuator arm 52-1 coupling to a first head gimbal assembly 60-1 including a first load tab 78-1 for contacting a third tab ramp 78-3 included in a disk clamp 300 to engage the first slider 90-1 into secure contact with the first disk surface 120-1. The head stack assembly further includes a second actuator arm 52-2 coupling to a second head gimbal assembly 60-2 and to a third head gimbal assembly 60-3.

The CSS hard disk drive 10 may further preferably operate as follows. Each slider 90 is moved a short distance away from its tab ramp 312 before starting the spindle motor 270 coupling to the disk(s) 12, and each of the sliders is moved the short distance away from the tab ramps before stopping the spindle motor. The short distance is at most one millimeter, and may preferably be about half a millimeter.

During the take-off process when the disks are started and the touchdown process when they are stopped, the sliders, such as the second slider 90-2 and the third slider 90-3 are preferably moved slightly away from the tab ramp a short distance d to relieve the load applied by the load tabs contacting the tab ramps before the spindle motor 270 is turned on to rotate the disks, for example, the first disk 12-1 and the second disk 12-2. The short distance may preferably be about ½ millimeter. These operations prevent weakening the durability of the CSS hard disk drive 10. This movement may be accomplished through biasing the voice coil motor 30 against an inside diameter crash stop 36 as shown in FIG. 5, or by providing a two-position latch mechanism.

Another embodiment of the invention may include manufacturing the CSS hard disk drive 10 by coupling the head stack assembly 50 to the embedded circuit 500 to provide the pitch actuation control signal PACS as asserted by the embedded circuit and coupling a humidity sensor 16H, a temperature sensor 16T and an air pressure sensor 16P to the embedded circuit to provide the humidity reading 170H, the temperature reading 170T, and the pressure reading 170P used in the method. The temperature sensor and the humidity sensor may preferably be merged into a single package, such as provided by Sensirion, who may also provide an air pressure sensor. The CSS hard disk drive is a product of this manufacturing process.

Manufacturing the CSS hard disk drive 10 preferably includes electrically coupling the invention's head stack assembly 50 through the embedded circuit coupling ECC to the matching coupling MAC of the invention's embedded circuit 500 and pivotably mounting the head stack assembly 50 to the disk base 14 through the actuator pivot 58 to position the slider 90 near the disk surface 120-1 to create the CSS hard disk drive.

Manufacturing the CSS hard disk drive may include any combination of several processes. First, the CSS hard disk drive 10 including the first disk 12-1, may preferably be manufactured by rotatably coupling the disk between the disk clamp 300 and the spindle motor 270 about the spindle shaft center 42, placing the first tab ramp close to the first disk surface 120-1 and the second tab ramp close to the second disk surface 120-2 and installing a head stack assembly 50 including the first head gimbal assembly 60-1 near the first disk surface 120-1 and further including the second head gimbal assembly 60-2 near the second disk surface 120-2 to create the CSS hard disk drive.

Manufacturing this CSS hard disk drive 10 may preferably further include assembling the disk spacer 310 between the second disk surface 120-2 and the third disk surface 120-3 by rotatably coupling a spindle motor 270 to the first disk 12-1 and the second disk 12-2 through the spindle shaft center 42, and installing a head stack assembly 50 including the third head gimbal assembly 60-3 and the fourth head gimbal assembly 60-4 between the third disk surface and the fourth disk surface 120-4 to create the CSS hard disk drive.

Figure 5A:
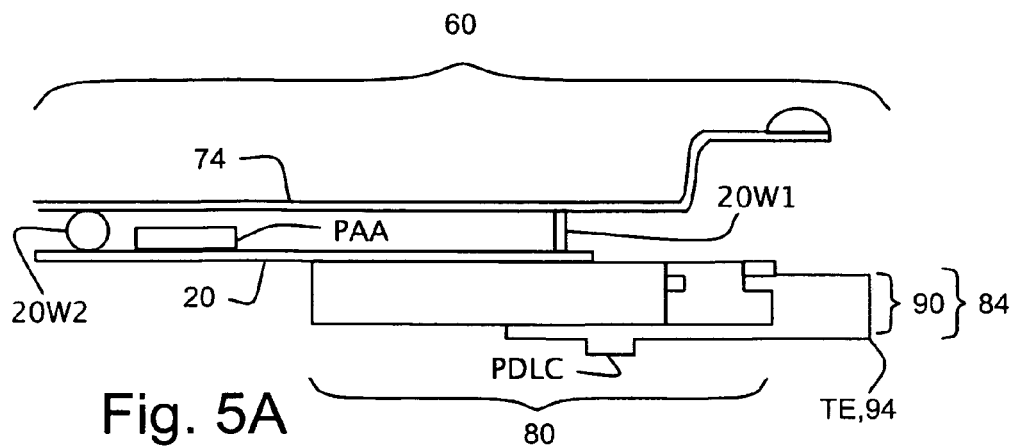
FIGS. 5A and 5B show various aspects of the invention's head gimbal assembly.

In further detail, FIG. 5A shows a side view of an embodiment of the head gimbal assembly 60 with a micro-actuator assembly 80 for aiding in laterally positioning of the slider 90. In certain embodiments, the micro-actuator assembly may employ a piezoelectric effect and/or an electrostatic effect and/or a thermal mechanical effect. The head gimbal assembly may preferably include a base plate 72 coupled through a hinge 70 to the load beam 74. Often the flexure finger 20 is coupled to the load beam and the micro-actuator assembly 80 and slider 90 are coupled through the flexure finger to the head gimbal assembly.

Figure 5B:
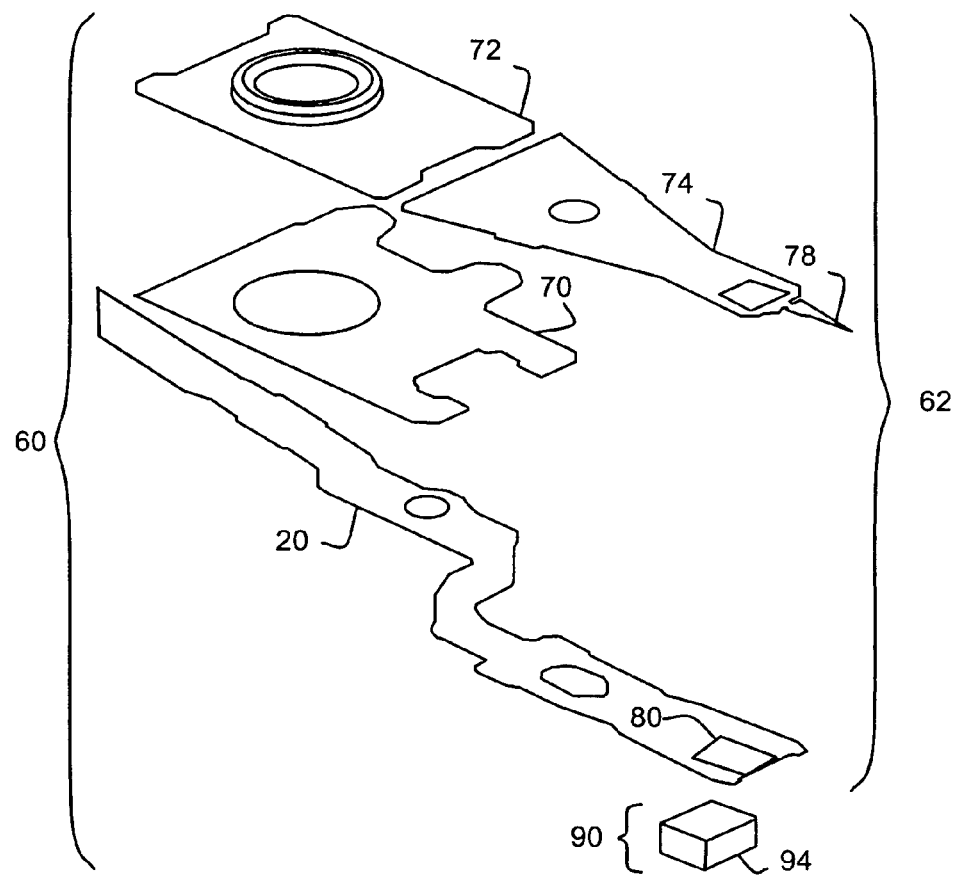
Figure 6B:
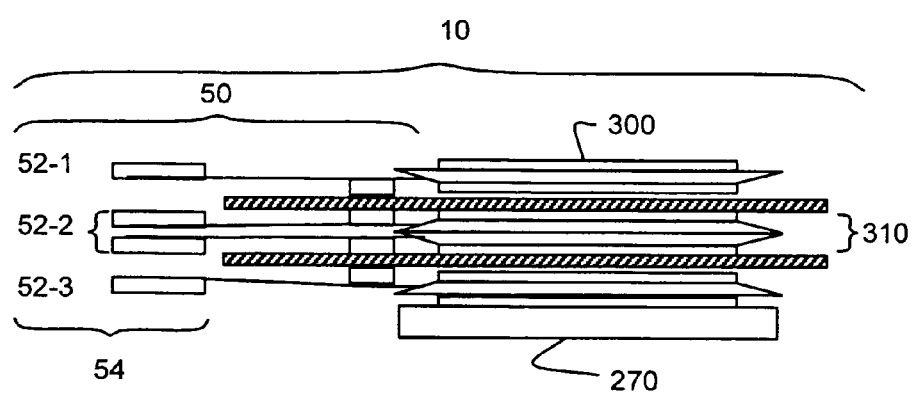
Figure 21B:
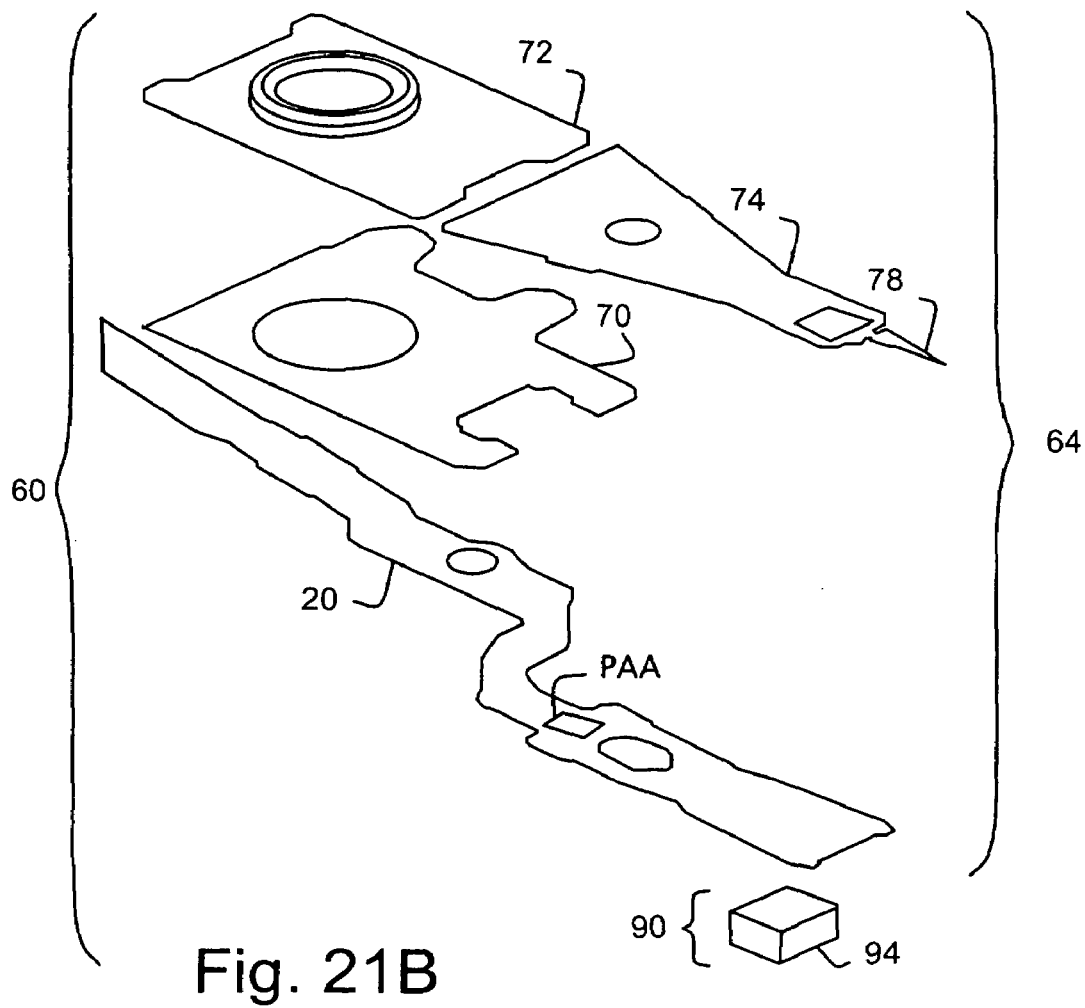
FIG. 21B shows the actuator mounted head suspension assembly used in some embodiments of the method of manufacturing the invention's head gimbal assembly.

The head gimbal assembly 60, may preferably include a load tab 78 as shown in FIGS. 5B and 21B, coupling through a load beam 74 to engage the slider 90, where the load tab contacts a tab ramp 312 away from the slider, as shown in FIG. 6B. The tab ramps preferably serve as a cam through contacting the load tabs of head gimbal assemblies to engage their sliders into secure contact with their neighboring disk surfaces during non-operation periods.

The disk clamp 300 may preferably support parking the sliders on disk surfaces by including a third tab ramp. The spindle motor 270 may preferably support parking the sliders on disk surfaces by including a fourth tab ramp. The disk spacer 310 preferably supports parking the sliders on disk surfaces by including a third tab ramp radially mounted to a fourth tab ramp, which form a radially symmetric triangular extension from the disk spacer about the spindle shaft center 42.

The CSS hard disk drive 10 may further include a second disk surface 120-2 for access by a second head gimbal assembly 60-2 including a third load tab 78-3 for contact with a third tab ramp near the far inside diameter ID of the second disk surface. The CSS hard disk drive may further include a disk clamp 300 containing the first tab ramp and a spindle motor 270 containing the second tab ramp.

The CSS hard disk drive 10 may further include a disk spacer 310 including a third tab ramp 312-3 facing the second disk surface 120-2 and coupling to a fourth tab ramp 312-4 facing a third disk surface 120-3 included in a second disk 12-2, a third head gimbal assembly 60-3 including a third load tab 78-3 for contacting the third tab ramp to engage a third slider 60-3 into the secure contact of the second disk surface, and a fourth head gimbal assembly 60-4 including a fourth load tab 78-4 facing the third disk surface.

The head stack assembly 50 for the CSS hard disk drive 10 may preferably include a head stack 54 coupling through an actuator arm 52 to at least one head gimbal assembly 60, and a main flex circuit 200 electrically coupling to the flexure finger 20, where the main flex circuit includes an embedded circuit coupling ECC for providing the pitch actuation control signal PACS to the pitch actuator PAA. The main flex circuit may further include a preamplifier 24 providing the pitch actuation control signal to the pitch actuator, where the preamplifier receives a pitch control signal PCS through the embedded circuit coupling to create the pitch actuation control signal.

The head stack 54 may couple to at least two of the head gimbal assemblies. By way of example, consider FIG. 18 showing the head stack 54 including the actuator arm 52, a second actuator arm 52-2 and a third actuator arm 52-3, coupling to the head gimbal assembly 60, a second head gimbal assembly 60-2, a third head gimbal assembly 60-3, and a fourth head gimbal assembly 0-4. The second actuator arm coupled to the second head gimbal assembly and a third head gimbal assembly 60-3, and the third actuator arm coupled to the fourth head gimbal assembly. The second head gimbal assembly includes the second load tab 78-2 for engaging the second slider 90-2. The third head gimbal assembly includes the third load tab 78-3 for engaging the third slider 90-3. And the fourth head gimbal assembly includes the fourth load tab 78-4 for engaging a fourth slider 90-4.

The main flex circuit 200 may provide the pitch actuation control signal PACS to the pitch actuator PAA included in the head gimbal assembly 60 and provide a second pitch actuation control signal PACS-2 to a second pitch actuator PAA2 included in a second head gimbal assembly 60-2. The preamplifier 24 included in the main flex circuit may further provide the pitch actuation control signal to the first pitch actuator and provide the second pitch actuation control signal to the second pitch actuator.

Alternatively, the main flex circuit 200 may provide the same pitch actuation control signal PACS3 to both pitch actuators, for example, to the third pitch actuator PAA3 included in the third head gimbal assembly 60-3 and to the fourth pitch actuator PAA4 included in the fourth head gimbal assembly 60-4. The preamplifier 24 may further provide the pitch actuation control signal to both the first pitch actuator and the second pitch actuator.

Figure 7A:
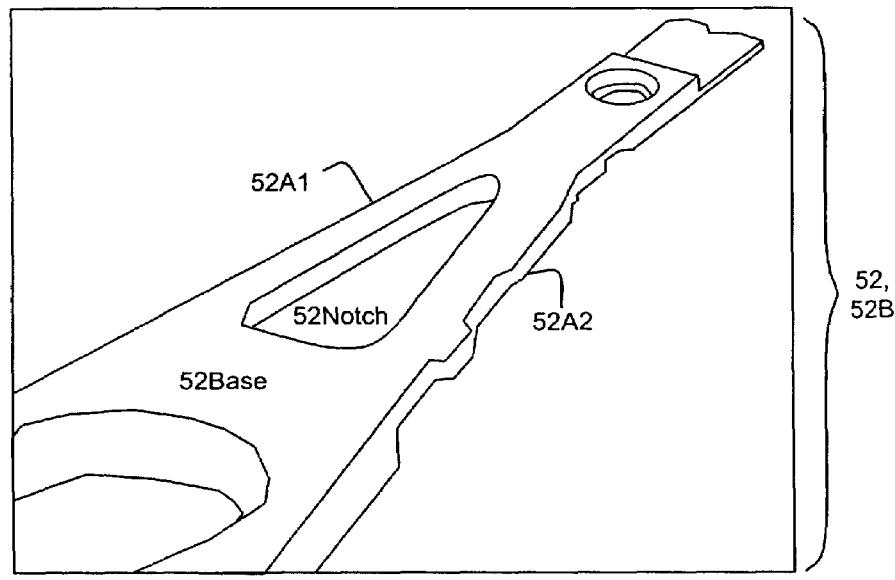
FIGS. 7A to 9B show various aspects of the invention's actuator arm.

An actuator arm 52 tends to include an actuator notch 52Notch made from an actuator arm base 52Base coupling through a first actuator arm bridge 52A1 and a second actuator arm bridge 52A2, which join together to hold the swage site 52S as shown in FIG. 7A. Conventional wisdom dictates that the actuator notch is useful in reducing the mass of the actuator arm, which retaining sufficient rigidity to perform its purpose of holding a head gimbal assembly over a rotating disk surface to access a track.

Alternatively, the actuator arm 52 may include an island 52I coupled through a mote 52M to at least two of an actuator base 52Base, a first actuator arm bridge 52A1, and a second actuator arm bridge 52A2, as shown in FIGS. 7B to 9B. The mote is preferably composed of a self-adhesive rubber and/or plastic, and the island may be composed of a metal, often preferred to be a non out-gassing metal such as a form of stainless steel.

The island 52I may couple through the mote to each of the actuator base, the first actuator arm bridge and the second actuator arm bridge. The mote may be composed of a single connected component, or multiple separate connected components. The mote may or may not surround the island. The island may not couple through the mote to each of the actuator base, the first and the second actuator arm bridge, for example, the coupling through the mote may be to the first and second actuator arm bridges, but not to the actuator base.

Figure 7B:
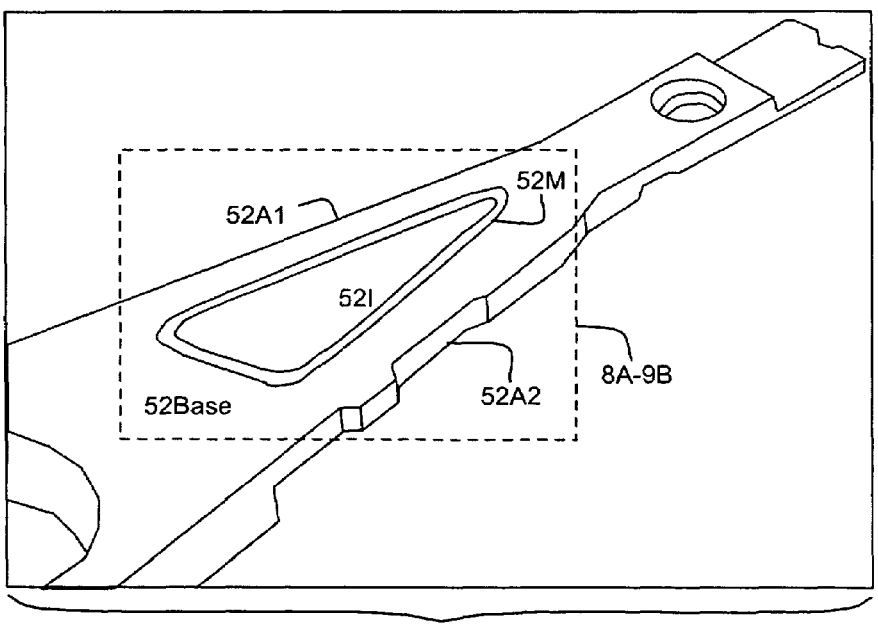

FIG. 7B shows the general relationship found in certain embodiments between the island 52I coupling through the mote 52M to at least two of the actuator base 52Base, the first actuator arm bridge 52A1 and the second actuator arm bridge 52A2. FIGS. 8A to 9B show various alternative embodiments, which are provided as examples of various embodiments and not as an exhaustive catalog.

Figure 8A:
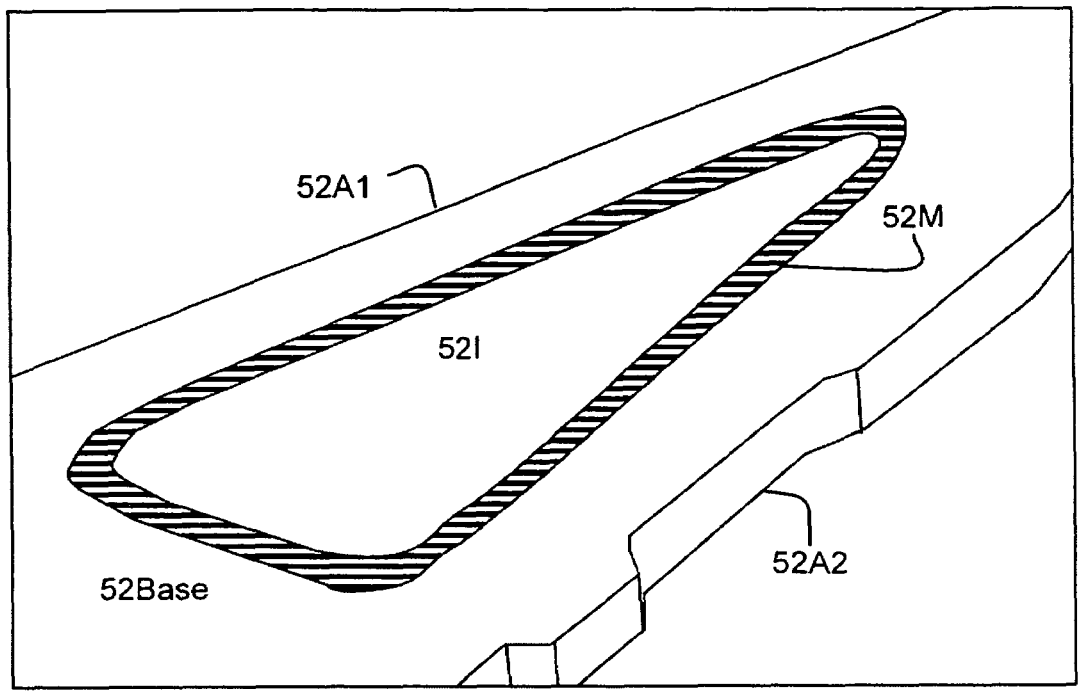

FIG. 8A shows the island 52I coupling through the mote 52M to each of the actuator base 52Base, the first actuator arm bridge 52A1 and the second actuator arm bridge 52A2.

Figure 8B:
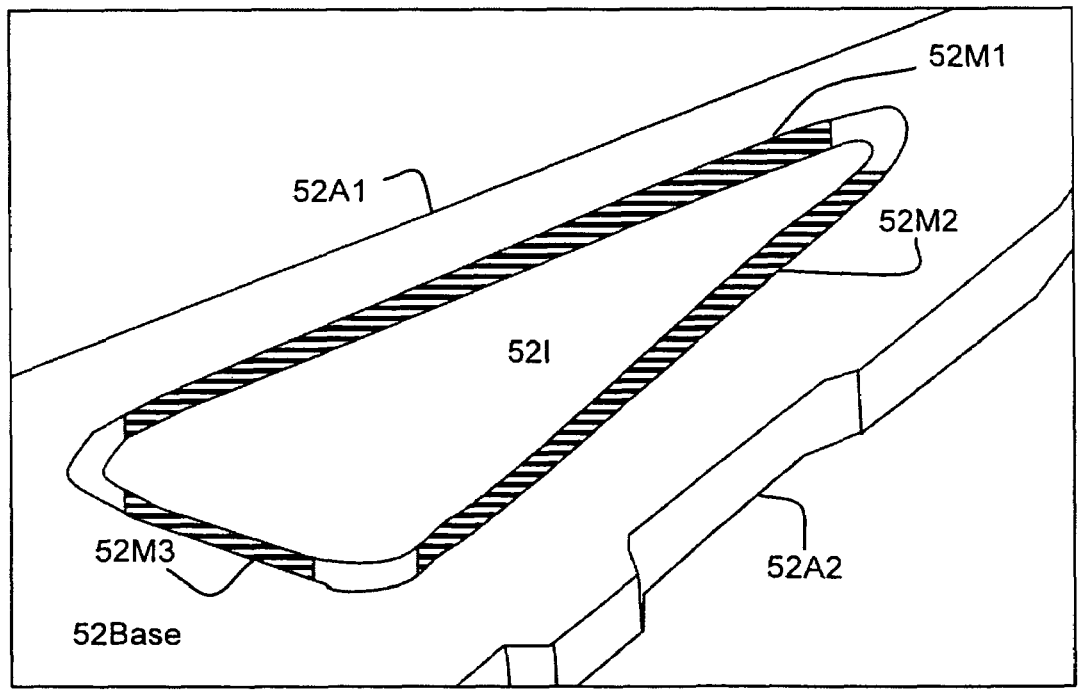

FIG. 8B shows alternative to the actuator arm 52 of FIG. 8A including the island 52I coupling through the mote 52M to each of the actuator base 52Base, the first actuator arm bridge 52A1 and the second actuator arm bridge 52A2. In this embodiment, the mote is formed of a first mote component 52M1, a second mote component 52M2 and a third mote component 52M3, each of which is a separate connected component.

Figure 9A:
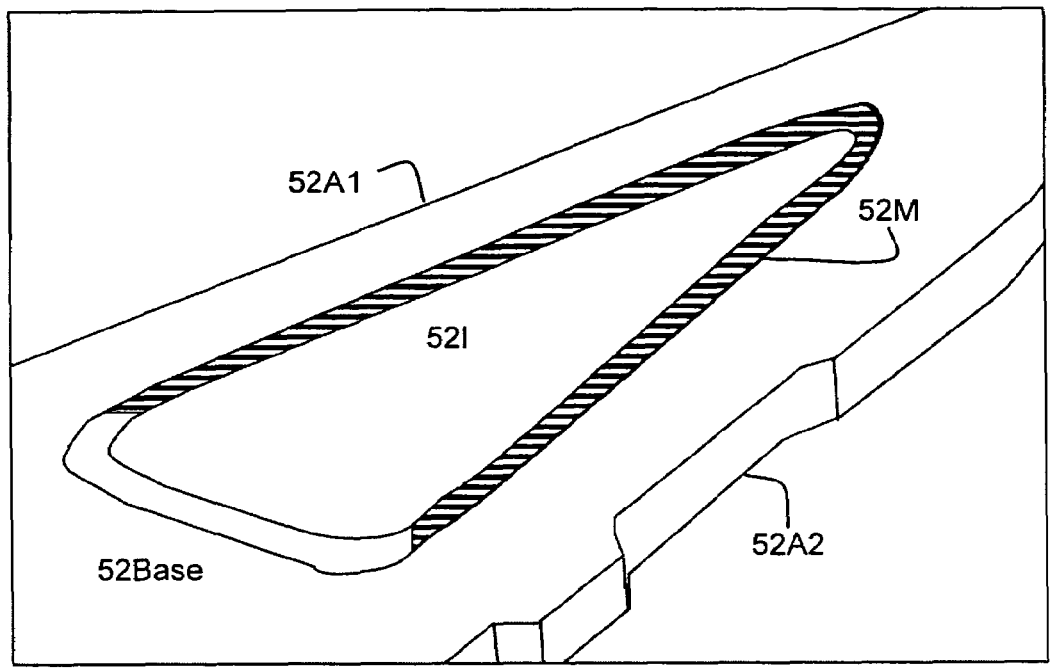

FIG. 9A shows another embodiment of the actuator arm 52 of FIG. 7B including the island 52I coupling through the mote 52M to each of the first actuator arm bridge 52A1 and the second actuator arm bridge 52A2, and not coupling to the actuator base 52Base.

Figure 9B:
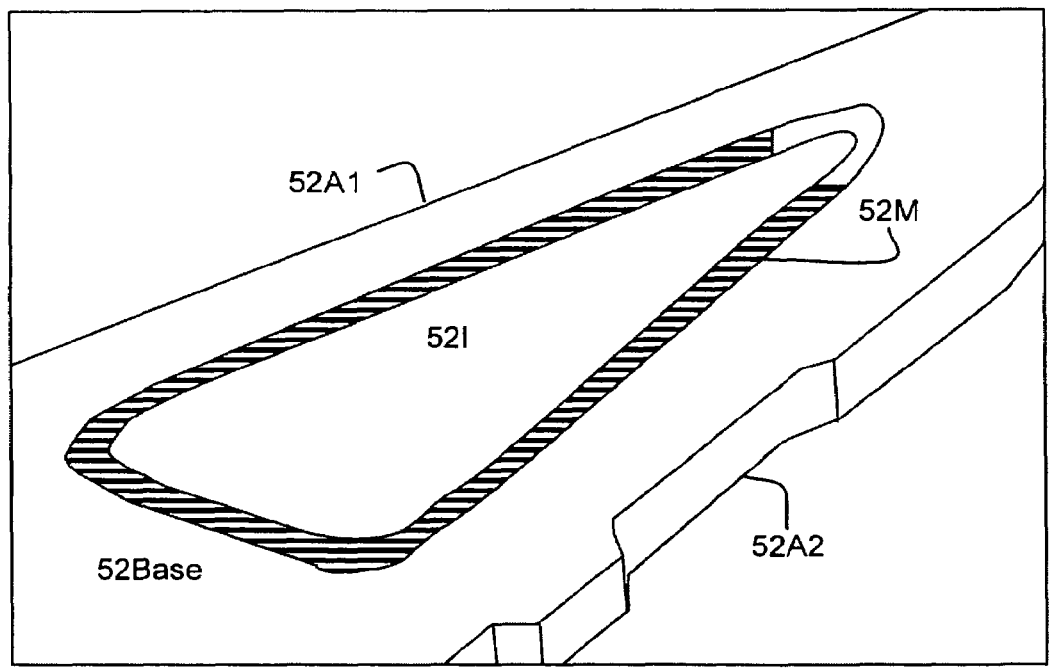
Figure 10:
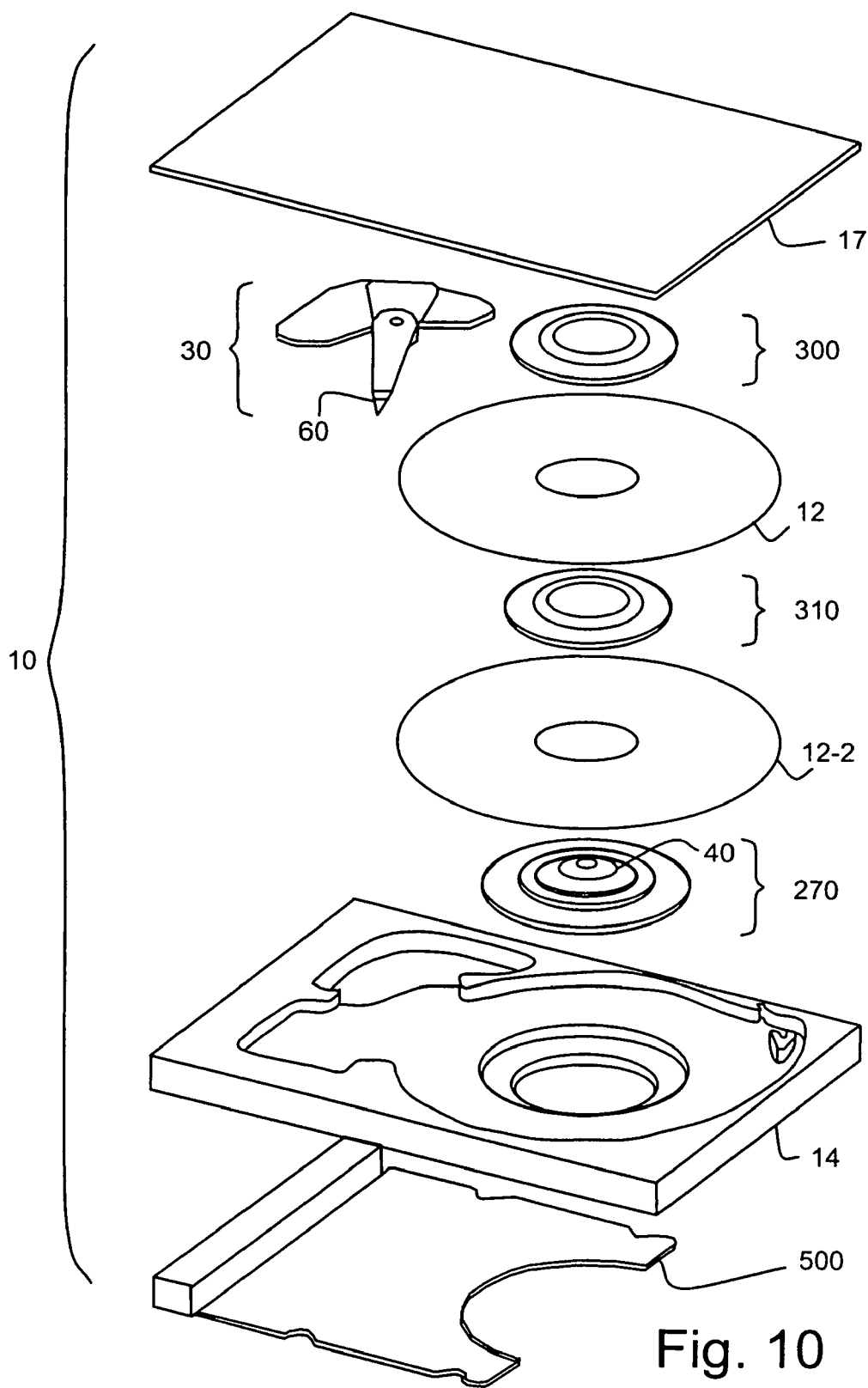
FIGS. 10 to 12 show various aspects of the invention's CSS hard disk drive.
Figure 11:
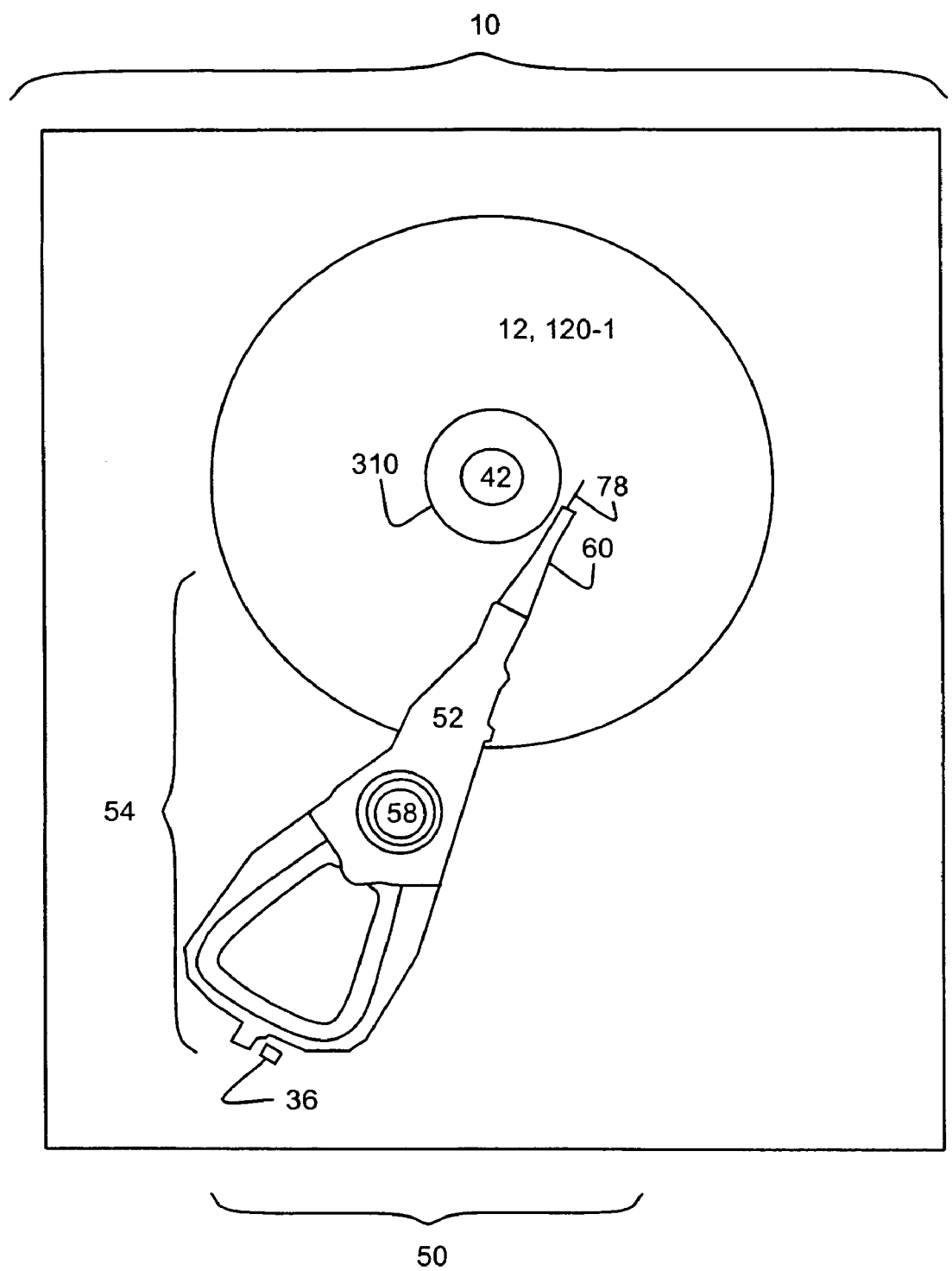

FIG. 9B shows alternative to the actuator arm 52 of FIG. 8A including the island 52I coupling through the mote 52M to each of the actuator base 52Base, the first actuator arm bridge 52A1 and the second actuator arm bridge 52A2. In this embodiment, the mote is formed of a just one connected component, but does not surround the island as it does in FIG. 8A.

Embodiments of the invention's CSS hard disk drive 10 may include the head stack assembly 50 electrically coupling through the embedded circuit coupling ECC to the matching coupling MAC of the embedded circuit 500, and the head stack assembly pivotably mounted to a disk base 14 through an actuator pivot 58 in the head stack 54 to position the slider 90 included in the head gimbal assembly 60 near the disk surface 120-1 of the disk 12 rotatably mounted on a spindle motor 270 coupled to the disk base.

In normal operation the head stack assembly 50 preferably pivots through an actuator pivot 58 to position at least one read-write head 94, embedded in a slider 90, over a rotating disk surface 120-1. The data stored on the rotating disk surface is typically arranged in concentric tracks. To access the data of a track 122, a servo controller first positions the read-write head by electrically stimulating the voice coil motor 30, which couples through the voice coil 32 and an actuator arm 52 to move a head gimbal assembly 60 in lateral positioning the slider close to the track as shown in FIG. 6A. Once the read-write head is close to the track, the embedded circuit typically enters an operational mode known herein as track following. It is during track following mode that the read-write head is used to access the data stored on the track.

The CSS hard disk drive 10 may further include more than two disks and more than one disk spacer. By way of example, the invention's CSS hard disk drive may include three disks separated by two disk spacers.

The preceding embodiments provide examples of the invention and are not meant to constrain the scope of the following claims.

What is claimed is:

1. A method of operating a head stack assembly for at least one member of a parking operation group consisting of a take-off process of at least one slider from a rotating disk surface of a Contact Start-Stop (CSS) hard disk drive and a touchdown process of said slider to the disk surface of the CSS hard disk drive, comprising the step:

receiving a temperature reading from a temperature sensor, a pressure reading from an air pressure sensor and a humidity reading from a humidity sensor;

wherein said method further comprises at least one member of the group consisting of the steps:

first asserting a pitch actuation control signal for at least part of said take-off process based upon said temperature reading, said pressure reading, and said humidity reading; and second asserting said pitch actuation control signal for at least part of said touchdown process based upon said temperature reading, said pressure reading, and said humidity reading;

wherein when said pitch actuation control signal is asserted, a pitch actuator stimulated by said pitch actuation control signal causes said pitch actuator to alter a pitch angle of said slider coupled through a flexure finger to said pitch actuator, wherein said CSS hard disk drive, includes: said slider coupled through a flexure finger to said pitch actuator, said temperature sensor, said humidity sensor, and said air pressure sensor.

2. The method of claim 1, further comprising the steps:
first asserting said pitch actuation control signal for at least part of said take-off process based upon said temperature reading, said pressure reading, and said humidity reading; and
second asserting said pitch actuation control signal for at least part of said touchdown process based upon said temperature reading, said pressure reading, and said humidity reading.

3. The method of claim 1, wherein for each of said sensors in said CSS hard disk drive, said CSS hard disk drive includes:
a pitch actuator stimulated by said pitch actuation control signal causing said pitch actuator to alter said pitch angle of said slider coupled through said flexure finger to said pitch actuator.

4. The method of claim 1, further comprising the step:
third asserting said pitch actuation control signal during track following based upon said temperature reading, said pressure reading and said humidity reading.

5. The method of claim 1, further comprising a member of the group consisting of the steps:
fourth asserting said pitch actuation control signal for at least part of a track seek process; and
fifth asserting said pitch actuation control signal for at least part of said track seek process based upon said temperature reading, and/or said pressure reading and/or said humidity reading.

6. An embedded circuit for operating said CSS hard disk drive and implementing the method of claim 1, comprising:
an embedded processor receiving said temperature reading from said temperature sensor, said pressure reading from said air pressure sensor and said humidity reading from said humidity sensor; and
wherein said embedded circuit further comprises at least one member of the group consisting of:
said embedded processor first asserting said pitch actuation control signal for at least part of said take-off process based upon said temperature reading, said pressure reading, and said humidity reading; and
said embedded processor second asserting said pitch actuation control signal for at least part of said touchdown process based upon said temperature reading, said pressure reading, and said humidity reading.

7. The embedded processor of claim 6, comprising: at least one controller;
wherein for each of said controllers included in said embedded processor,
said controller receives at least one input,
said controller maintains and updates at least one state, and
said controller generates at least one output based upon at least one member of the group consisting of: said inputs and said states;
wherein at least one of said states of at least one of said controllers includes at least one member of the group consisting of a non-redundant digital representation, a redundant digital representation, and an analog representation.

8. The embedded processor of claim 7, comprising:
means for receiving said temperature reading from said temperature sensor, said pressure reading from said air pressure sensor and said humidity reading from said humidity sensor; and
wherein said embedded processor further comprises at least one member of the group consisting of:
means for first asserting said pitch actuation control signal for at least part of said take-off process based upon said temperature reading, said pressure reading, and said humidity reading; and
means for second asserting said pitch actuation control signal for at least part of said touchdown process based upon said temperature reading, said pressure reading, and said humidity reading.

9. The embedded processor of claim 8, further comprising:
means for first asserting said pitch actuation control signal for at least part of said take-off process based upon said temperature reading, said pressure reading, and said humidity reading; and
means for second asserting said pitch actuation control signal for at least part of said touchdown process based upon said temperature reading, said pressure reading, and said humidity reading.

10. The embedded processor of claim 8, further comprising:
means for third asserting said pitch actuation control signal during track following based upon said temperature reading, said pressure reading and said humidity reading.

11. The embedded processor of claim 10, further comprising a member of the group consisting of:
means for fourth asserting said pitch actuation control signal for at least part of a track seek process; and
means for fifth asserting said pitch actuation control signal for at least part of said track seek process based upon said temperature reading, and/or said pressure reading and/or said humidity reading.

12. The embedded processor of claim 11, wherein at least one member of a means group includes at least one instance of at least one member of the group consisting of:
a computer directed by a program system including program steps residing in a memory accessibly coupled the computer, a finite state machine, an inferential engine, and a neural network;
wherein said means group consists of: said means for receiving, said first for asserting, said second for asserting, said third for asserting, said fourth for asserting and said fifth means for asserting;
wherein said computer includes at least one data processor and at least one instruction processor.

13. The program system for directing said embedded processor of claim 11 and implementing said method, comprising the program step:

receiving said temperature reading from said temperature sensor, said pressure reading from said air pressure sensor and said humidity reading from said humidity sensor;

wherein said program system further comprises at least one member of the group consisting of the program steps:

first asserting said pitch actuation control signal for at least part of said take-off process based upon said temperature reading, said pressure reading, and said humidity reading; and second asserting said pitch actuation control signal for at least part of said touchdown process based upon said temperature reading, said pressure reading, and said humidity reading.

14. The program system of claim 13, further comprising the program steps:

first asserting said pitch actuation control signal for at least part of said take-off process based upon said temperature reading, said pressure reading, and said humidity reading; and second asserting said pitch actuation control signal for at least part of said touchdown process based upon said temperature reading, said pressure reading, and said humidity reading.

15. The program system of claim 13, further comprising the program step:

third asserting said pitch actuation control signal during track following based upon said temperature reading, said pressure reading and said humidity reading.

16. The program system of claim 13, further comprising a member of the group consisting of:

fourth asserting said pitch actuation control signal for at least part of said track seek process; and fifth asserting said pitch actuation control signal for at least part of said track seek process based upon said temperature reading, and/or said pressure reading and/or said humidity reading.

17. A method of manufacturing said embedded processor of claim 8, comprising the steps:

providing said means for receiving and at least one member of the group consisting of said means for first asserting said pitch actuation control signal for at least part of said take-off process, said means for second asserting said pitch actuation control signal for at least part of said touchdown process to create said embedded processor.

18. The embedded processor as a product of the process of claim 17.

19. A method of manufacturing said embedded circuit of claim 6, comprising the steps:

providing said embedded processor to create said embedded circuit.

20. The embedded circuit as a product of the process of claim 19.

21. The CSS hard disk drive using said embedded circuit of claim 6 to implement said method, comprising:

a head stack assembly coupling to said embedded circuit to deliver said pitch actuation control signal to said pitch actuator in at least one head gimbal assembly for altering said pitch angle of said slider to said disk surface it accesses; a at least one sensor coupling of said humidity sensor, said temperature sensor and said air pressure sensor to said embedded circuit to provide said humidity reading, said temperature reading, and said pressure reading used in said method.

22. The CSS hard disk drive of claim 21, wherein said pitch actuator includes at least one member of the group consisting of:

an electrostatic coupling responding to said pitch actuation control signal to urge said flexure finger toward said load beam to flex said flexure finger, altering said pitch angle of said slider; and a piezoelectric stack coupling to said flexure finger to urge said flexure finger toward said load beam to flex said flexure finger altering said pitch angle of said slider, when said piezoelectric stack is stimulated by said pitch actuation control signal.

23. The CSS hard disk drive of claim 21, wherein for each of said sensors in said CSS hard disk drive, said CSS hard disk drive further comprises:

a pitch actuator stimulated by said pitch actuation control signal causing said pitch actuator to alter said pitch angle of said slider coupled through said flexure finger to said pitch actuator.

24. A method of manufacturing said CSS hard disk drive of claim 21, comprising the step:

coupling said head stack assembly to said embedded circuit to provide said pitch actuation control signal as asserted by said embedded circuit to said pitch actuator and coupling said humidity sensor, said temperature sensor and said air pressure sensor to said embedded circuit to provide said humidity reading, said temperature reading, and said pressure reading to create said CSS hard disk drive.

25. The CSS hard disk drive as a product of the process of claim 24.

* * * * *